(12) United States Patent  
Akamatsu et al.

(10) Patent No.: US 8,756,385 B2
(45) Date of Patent: Jun. 17, 2014

(54) SOFTWARE CONFIGURATION ITEM BACK-UP FACILITY

(75) Inventors: Takeshi Akamatsu, Kanagawa-ken (JP); Kazuhito Akiyama, Kanagawa-ken (JP); Yumi Kino, Kanagawa-ken (JP); Takashi Terao, Kanagawa-ken (JP); Tadashi Tsumura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/479,431

(22) Filed: Jun. 5, 2009

(65) Prior Publication Data

US 2009/0327630 A1    Dec. 31, 2009

(30) Foreign Application Priority Data

Jun. 30, 2008    (JP) ................................ 2008-171633

(51) Int. Cl.
*G06F 12/00*    (2006.01)
(52) U.S. Cl.
USPC ............................. 711/162; 711/161; 714/19
(58) Field of Classification Search
USPC .................... 711/161, 162; 714/19
See application file for complete search history.

(56) References Cited

U.S. PATENT DOCUMENTS

| 7,330,997 | B1 * | 2/2008 | Odom | 714/6.23 |
| 7,640,454 | B1 * | 12/2009 | Botes | 714/19 |
| 2006/0112311 | A1 * | 5/2006 | Cobb | 714/16 |

FOREIGN PATENT DOCUMENTS

| JP | 6230902 A | 8/1994 |
| JP | 2000-250742 A | 9/2000 |
| JP | 2000-250742 A1 | 9/2000 |
| JP | 2000-293365 A | 10/2000 |
| JP | 2000-293365 A1 | 10/2000 |
| JP | 2003532190 A | 10/2003 |
| JP | 2008140415 A | 6/2008 |

\* cited by examiner

*Primary Examiner* — Gurtej Bansal
(74) *Attorney, Agent, or Firm* — Nelson and Nelson; Daniel P. Nelson; Alexis V. Nelson

(57) ABSTRACT

A system may identify a second software configuration item for possible backup in response to selection of a first software configuration item for backup, where the first and second software configuration items are related. The system may include a detecting unit for detecting information regarding at least one hardware and at least two software configuration items. A repository may store a set of data for each configuration item based on the detected information. The set of data may include a predetermined attribute of the configuration item and a relation between the configuration item and another configuration item. An identifying unit may then identify the second software configuration item from the attribute and/or the relation upon selection of the first software configuration item for backup.

20 Claims, 20 Drawing Sheets

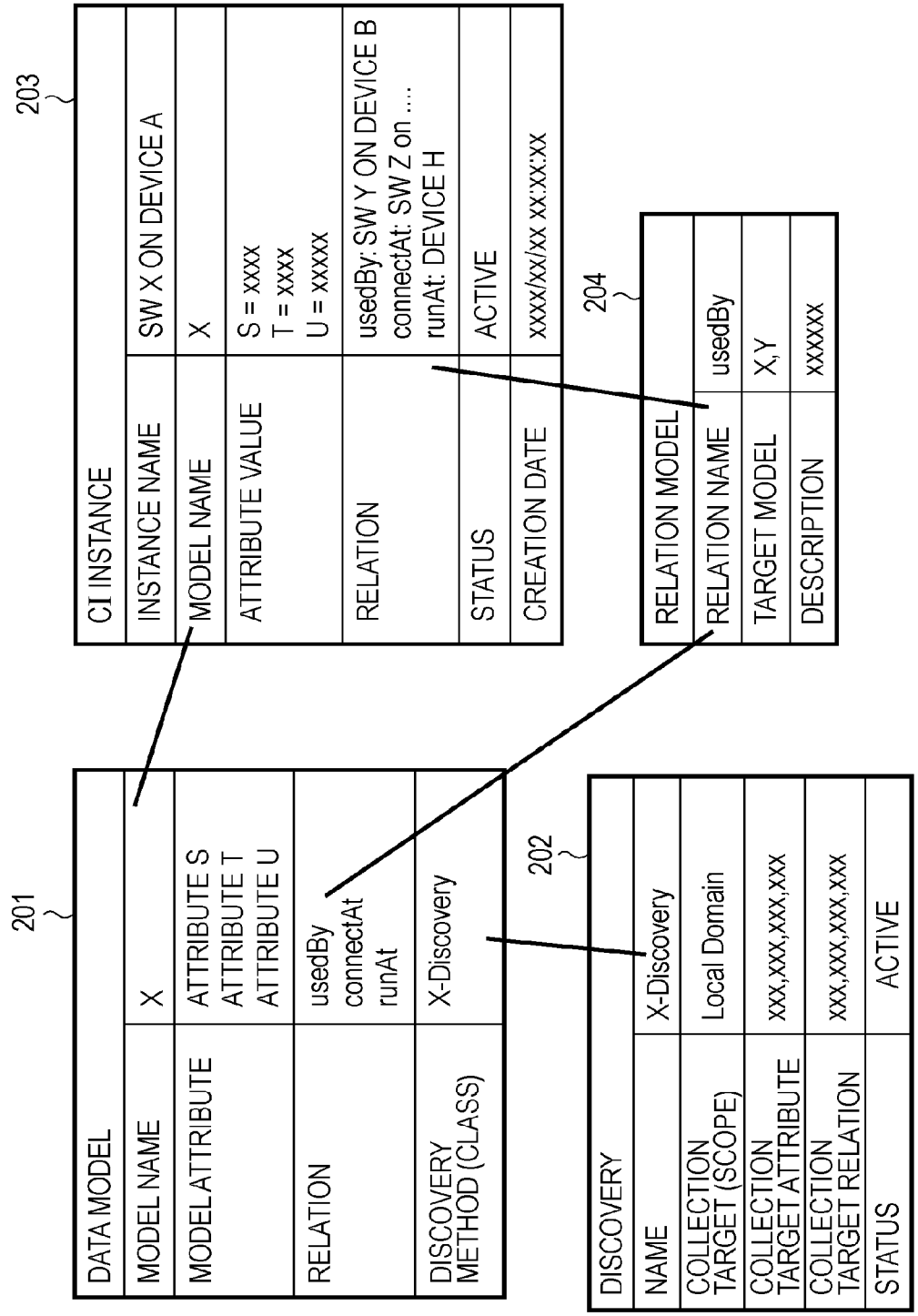

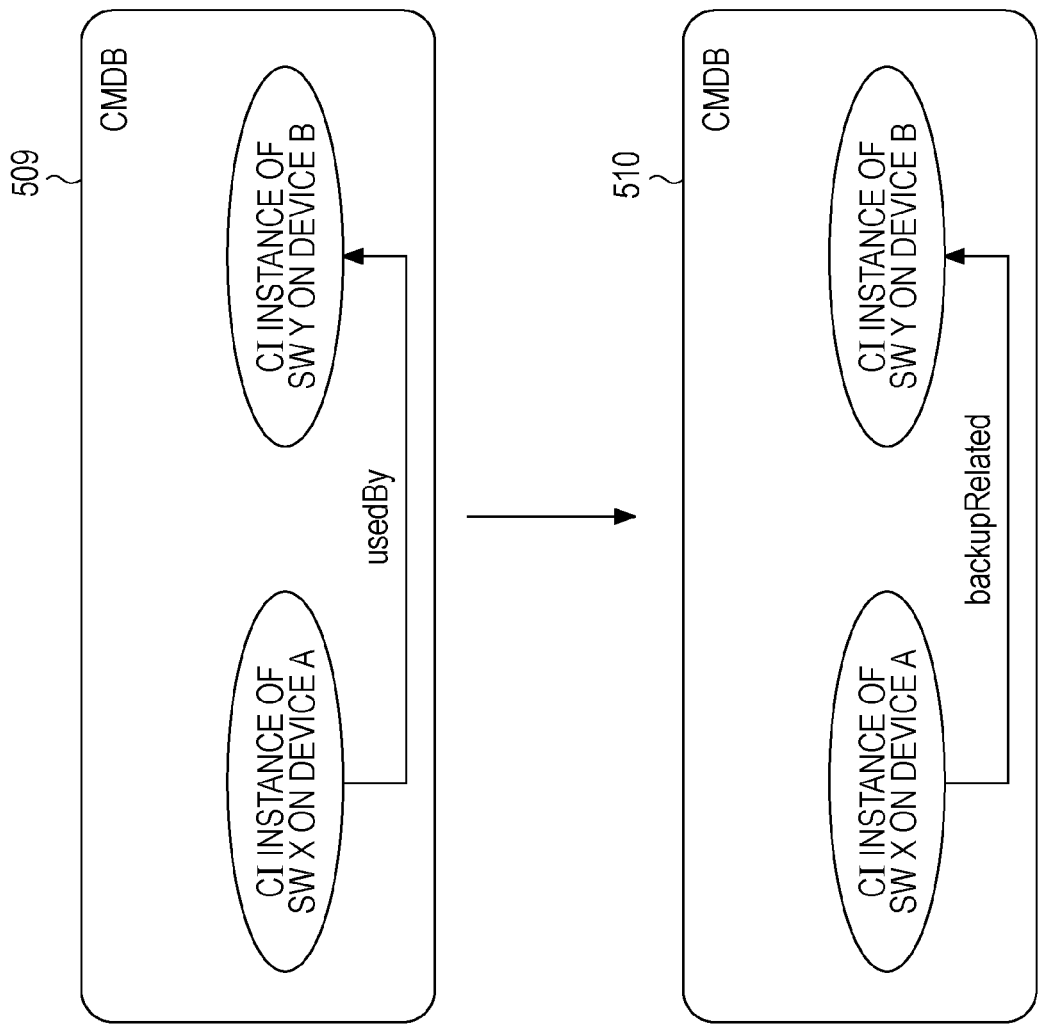

SOFTWARE CONFIGURATION ITEM BACK-UP FACILITY

BACKGROUND

Many computer-related or information technology ("IT") devices may be used at a data center. Temporary changes in the states of the devices, arising from modifications to hardware and software, may complicate proper management and optimization. A system administrator, for example, may back up data and software for system restoration after modifications have taken place. Since a modified system may include multiple types of middleware, the backup data may not function to restore the system unless the system and the middleware have been synchronized.

In some data centers, a single IT device may be used for various purposes. In such an environment, the system may need to be reconstructed for each usage. This may require reintroducing and reconfiguring previously-introduced middleware with each usage, with added expense.

Further, a product-testing division may test various IT devices. For improved efficiency, an introduction image for each IT device may be used to construct a test environment to determine which operating system ("OS") and middleware should be used. A combination of related middleware, such as an OS, a Web application server ("WAS"), and a data server, may be required for the test environment. Since versions of hardware or software must be strictly set, however, the middleware used in the test environment may need to be configured and re-configured according to the particular versions of the IT devices under test.

SUMMARY

Embodiments of the invention have been developed to identify software configuration items for possible backup in response to a software configuration item selected for backup.

In one embodiment of the invention, a system may identify a second software configuration item for possible backup in response to selection of a first software configuration item for backup, where the first and the second software configuration items are related. The system may include a detecting unit for detecting information regarding at least one hardware and at least two software configuration items. A repository may store a set of data for each configuration item based on the detected information. The set of data may include a predetermined attribute of the configuration item and a relation between the configuration item and another configuration item. An identifying unit may then identify the second software configuration item from the attribute and/or the relation upon selection of the first software configuration item for backup.

A corresponding method and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 2B depicts an exemplary data model, discovery instance, CI instance, and relation model according to an embodiment of the invention;

FIG. 5C depicts a relation model having a relation attribute value "backupRelated" according to one embodiment of the invention;

DETAILED DESCRIPTION OF THE INVENTION

Figure 1A:
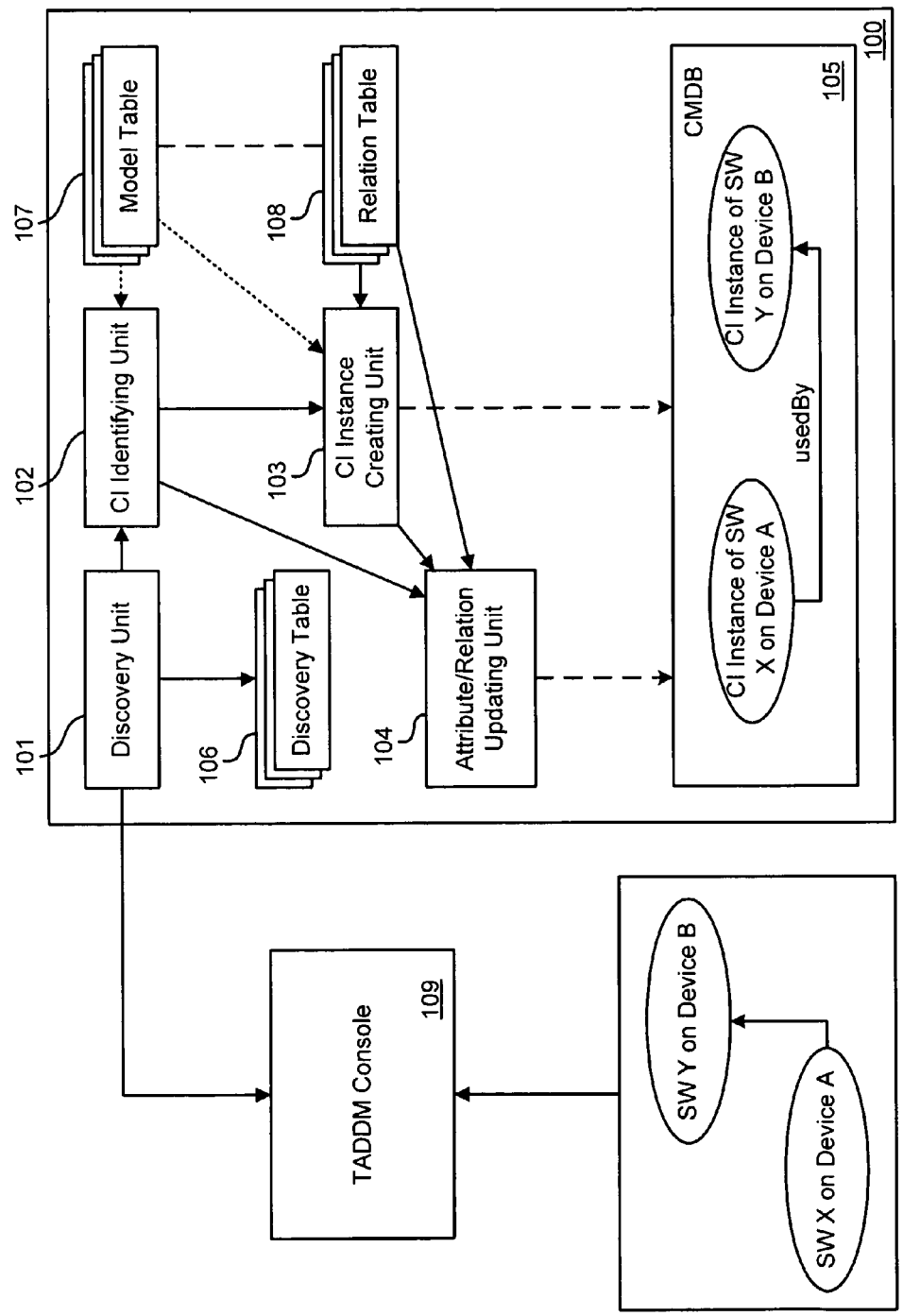
FIG. 1A is a block diagram of one embodiment of a CMDB-containing computer system for CI management.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

According to embodiments of the present invention, synchronized reusable backup data may be obtained by performing a backup operation in an IT system in a unit of actual transaction instead of a unit of a single system. In addition, in certain embodiments, IT resources may be effectively reused by managing backup data as a restorable configuration item or as a collection of configuration items.

GENERAL INFORMATION AND DEFINITIONS

The Information Technology Infrastructure Library ("ITIL") describes a set of best practices or preferred cases for realizing IT service management. The ITIL focuses on service support and service delivery. As used herein, the term "configuration management" refers to a service support process that recognizes configuration items ("CI") that are targets of IT service management. Configuration management may also maintain, update, confirm, and audit information regarding the configuration items.

As used herein, the term "configuration item" or "CI" refers to a resource that is subject to configuration management. Configuration items may include system resources such as hardware and software configuration items, equipment for providing IT services, documents such as regulation books, work procedures, and configuration diagrams. The configuration diagrams may relate to operation of IT services, services such as maintenance information, processes, and human resources.

The ITIL framework recommends that the configuration items be managed in an integrated fashion using a database referred to as a "configuration management database" or "CMDB." As used herein, the term "CMDB" refers to a database that records at least one predetermined attribute of the configuration items and relations between the configuration items and other configuration items. By implementing the CMDB, a computer system managing the CMDB may accurately reflect information regarding the configuration items. Particularly, the computer system may automatically discover information regarding configuration items, a process referred to herein as "discovery" or "automatic detection," and may automatically update information regarding the configuration items, a process referred to herein as "tracking."

Service management software, such as "Tivoli® Change and Configuration Management Database" or "Tivoli CCMDB," produced and owned by International Business Machines Corporation or "IBM," may assist in constructing a CMDB and controlling an operation process based on the CMDB. Such service management software may further execute CI discovery and tracking.

Specifically, service management software may identify configuration items in a distributed network environment, such as servers, clients, an operating system ("OS"), middleware (Web/AP/DBMS/LDAP), package software, management tools, network devices, and storage devices. The service management software may automatically discover and update information regarding each configuration item, such as, for example, information regarding configurations of server and client computers, information regarding applications operating in each computer, information regarding configurations of a network attached storage ("NAS") and a printer connected to each computer, and information regarding configurations of a storage area network ("SAN") and a printer directly connected to a network.

Collecting information regarding each configuration item depends on management targets. Basically, a computer system that manages the CMDB may regularly access a management remote interface using Secure Shell ("ssh"), Simple Network Management Protocol ("SNMP"), or Windows Management Instrumentation ("WMI"), and may read configuration files or configuration information of the OS. Alternatively, the computer system that manages the CMDB may execute a setting confirmation instruction. As a result, an agent program may not need to be introduced to the configuration items to be managed.

To collect configuration items and relations between the configuration items and other configuration items without introducing an agent program to the configuration items, application discovery software such as Tivoli® Application Dependency Discovery Manager ("TADDM") may be used. The TADDM is one component of the CCMDB. Based on an information model suggested by IBM known as the Tivoli® Common Data Model ("CDM"), the information discovered and updated by the application discovery software may be sorted into sections (such as a computer system, a database, an application, and a process), classes, attributes, interfaces, relationships, and data types. Information regarding configuration items and relations between configuration items may be transferred to a GUI display tool, such as, for example, a TADDM console. The configuration items and the relations between configuration items may be visually displayed on a display device using individual blocks and links between blocks.

In one embodiment of the present invention, a repository may store at least one set of data. The set of data may include at least one predetermined attribute of a configuration item and a relation that includes the configuration item. The set of data may include, for example, data indicating at least one predetermined attribute of a software configuration item and a relation between the software configuration item and another software configuration item or hardware configuration item. The repository may be, for example, a CMDB. The configuration items and relations between the configuration items may be implemented by, for example, an instance of static data or an instance of a class of Java®. The repository may not be particularly limited, so long as the repository holds the set of data. In one embodiment, the repository may be a CMDB recording unit that records a CMDB.

Configuration Items

In one embodiment of the present invention, a computer system may set a plurality of configuration items as management targets. The configuration items may include at least one hardware configuration item and at least two software configuration items. The two software configuration items may include one software configuration item that is backed up to generate a second software configuration item.

The hardware configuration item may include, for example, a computer, a router, a network attached storage ("NAS"), a printer, a multifunction printer, and the like. The software configuration item includes, but not limited to, for example, software and data created with the software. The software configuration item may include an operating system, middleware, application software, and the like. Data created from the software may include, for example, a log file, a configuration file, files created with application software, and the like, which may be stored in a database. In one embodiment, configuration items may be arranged over a network.

In an embodiment of the present invention, hardware in which a software configuration item may be installed or stored may include an interface for backing up software data. The hardware may back up the software data through the interface.

In addition, in one embodiment, hardware may include an interface for restoring backup data. The hardware in which the backup data may be restored may also have installed an original software configuration item of the backup data, or may be compatible with hardware in which the original software configuration item of the backup data is installed.

Configuration Management Database

As previously mentioned, the CMDB may record at least one predetermined attribute of each CI, and a relation between CIs. Although the CMDB is conceptually a database, physically the CMDB may be a database system or a spreadsheet of spreadsheet software. Utilization of the CMDB may help an administrator to understand the relation between CIs.

Configuration Item Instance

As used herein, the term "configuration item instance" or "CI instance" may refer to data corresponding to a CI. Each CI instance may be represented in a CMDB as an instance of a data model. An example is an instance of static data, or an instance of a class of Java®.

In some embodiments, for example, the implemented Java® class instances may be stored in the CMDB with a mechanism for permanently storing the Java® class instances on a hard disk. These Java® class instances may be referred to, for example, as Java® data objects ("JDO"). As a result, even if the computer system is temporarily powered off, the Java® class instances may not be deleted. When the computer system is next powered on, the Java® class instances may be read from a storage device, e.g. the hard disk, and loaded into a main memory. The stored Java® class instances may then be updated or deleted by a Java® program.

Data Model

As used herein, the term "data model" refers to a schema for defining a CI and is an information model that provides a consistent definition regarding managed CIs and a relation between the CIs. More specifically, the data model defines a predetermined attribute of the CI and a relation between the CI and another CI (such as manufacturing equipment and a process). A data model for a configuration management database "CDM" suggested by IBM is known as an example of the data model. The implementation of the CDM is carried out, for example, based on a unified modeling language (UML).

Attribute

As used herein, the term "attribute" may identify an individual CI and describe the CI in management of the CI. An attribute may include, for example, a CI name (e.g., server, client, firewall), a serial number ID (e.g., a number, such as a serial number, for individually identifying a specific entity of a CI), a category (e.g., hardware, software, document), a type, a model number, a warranty period, a version number, a location (e.g., a place where a PC is placed, a library of software, a place where a medium is stored, a site providing a service), a responsible person name, a responsibility start date (e.g., a date when the responsible person is responsible for the CI), a provider name, license information, a provided date (e.g., a date when the CI is provided to an organization), a received date (e.g., a date when the CI is received by the organization), a usage start date (e.g., a date when the use of the CI is started), a status (e.g., operating, testing, out of order, or a future or planned CI status), and a status of an CI instance (e.g., active or inactive).

Relation

As used herein, the term "relation" refers to relationships between CIs. In some embodiments, a relation may be defined by a data model. Some examples may include "assigns," "canConnect," "canUse," "connectAt," "connects," "controls," "deployedOn," "Located," "Managed," "Owned," "provides," "runAt," "uses," and "usedBy."

Transaction Dependency

As used herein, the term "transaction dependency" refers to a type of CI relation in which a transaction takes place between two applications.

Referring now to FIG. 1A, a CMDB-containing computer system 100 may manage a plurality of CIs. FIG. 1A shows software (hereinafter, abbreviated as "SW") X of a device A and SW Y of a device B as examples of CIs.

The computer system 100 may include a discovery unit 101, a CI identifying unit 102, a CI instance creating unit 103, an attribute and relation updating unit 104, and a CMDB 105. The discovery unit 101, the CI identifying unit 102, the CI instance crating unit 103, the attribute and relation updating unit 104, and the CMDB may be implemented in a single computer, or may be implemented in a plurality of computers in a distributed manner. The computer system 100 may further include a discovery table 106, a model table 107, and a relation table 108. These tables may be implemented in a storage device of a single computer, or may be implemented in storage devices of a plurality of computers in a distributed manner.

FIG. 1A further illustrates an exemplary TADDM console screen 109. The screen 109 may display CIs and connection relations between the CIs. The CIs and the connection relations between the CIs displayed in the screen 109 is provided as an example only. One skilled in the art will recognize that not all management-target CIs and connection relations between CIs of the computer system (100) are displayed.

The discovery unit 101 may execute detection or discovery of information regarding a management-target CI of the CMDB. The computer system 100 may include a plurality of discovery units 101. In one embodiment, the management target my be connected to the computer system 100 via a wired or wireless network.

An administrator of the computer system 100 may freely set the detection target. A detection range may be specified using, for example, a domain name, an IP address, a MAC address, a device identifier, a database name, or combinations thereof. When the CI to be managed is, for example, an industrial device, the information regarding the industrial device may be detected. The detected information may be information regarding a new CI, or a value of an updated attribute or relation regarding an existing CI.

A new CI may be a CI that is detected by the discovery unit 101, but is not registered in the CMDB 105. An existing CI may be a CI whose CI instance has already been registered in the CMDB 105.

The discovery unit 101 may detect the information regarding the CI according to discovery information 202 (e.g., X-Discovery) stored in the discovery table 106. The discovery information 202 to be used may be specified in a discovery method of a data model 201. The discovery unit 101 may transfer the detected information regarding the CI to the CI identifying unit 102.

The CI identifying unit 102 may receive the information regarding the CI from the discovery unit 101 and may perform processing on the detection result. The CI identifying unit 102 may determine, with reference to the CMDB, whether the information regarding the CI is information regarding a new CI, or a value of an updated attribute or relation of an existing CI 105. This determination may be performed by comparing an instance name of the CI stored in the CMDB with information regarding the CI, for example.

Upon determining that the information regarding the CI is information regarding a new CI, the CI identifying unit 102 may transfer the information to the CI instance creating unit 103. Upon identifying that the information regarding the CI is a value of an updated attribute or relation of an existing CI, on the other hand, the CI identifying unit 102 may transfer the information to the attribute and relation updating unit 104.

The CI instance creating unit 103 may create a set of data, including a predetermined attribute of the CI and a relation between the CI and another CI, from corresponding information in the data model 201 and a relation model 204. The data model 201 may be stored in the model table 107, and the relation model 204 may be stored in the relation table 108. The set of data may be instantiated based on corresponding information detected by the discovery unit 101, or manually input information regarding the CI, as discussed in more detail with reference to FIG. 2A below. In one embodiment, for example, the set of data may be implemented by an instance of static data and an instance of a class of Java®. An example of the set of data may include a CI instance.

FIG. 2B depicts an example of a CI instance 203. The set of data may be stored in the CMDB 105. In addition, the set of data may include an attribute and a relation in the CI instance 203. Alternatively, an attribute may be stored in the CI instance, and a relation instance may be stored separately in the CMDB 105. In this case, the CI instance may include a link for identifying an associated relation instance.

The attribute and relation updating unit 104 may realize tracking in cooperation with the discovery unit 101. The attribute and relation updating unit 104 may reflect the value of the updated attribute or relation of the CI in the CI instance stored in the CMDB. More specifically, the attribute and relation updating unit 104 may update the value of the attribute or relation of the CI instance. The update may be performed by replacing the values with the information regarding the CI detected by the discovery unit 101. Specifically, all values of the attribute or relation of the CI instance may be replaced with the information regarding the CI detected by the discovery unit 101, or only different values may be replaced. The CMDB 105 may record the CI instances 203.

The discovery table 106 may store the discovery information 202. This discovery information may be used when the discovery unit 101 detects the CI information. The discovery information 202 may be implemented by an instance of static data or an instance of a class of Java®, for example. The discovery information may also be referred to as a discovery policy.

The discovery information 202 may include a range searched by the discovery unit 101, namely, a collection target (scope) that is a CI search range, an attribute to be collected, and a relation to be collected. The collection target may be specified by using, for example, a subnet IP address, a range of IP addresses, individual IP addresses, MAC addresses, device identifiers, host names, database names, or combinations thereof. In other embodiments, the collection target may be specified as a schedule management database connected to the computer system 100 via a network. The schedule management database may store, for example, data regarding management of processes using devices. In still other embodiments, the collection target may be specified as a database storing a batch processing definition file. When the collection target is the database storing the batch processing definition file, the discovery unit 101 may load the content of the batch processing definition file to perform detection. The batch processing definition file may store, for example, data describing the order of using devices.

In some embodiments, the model table 107 may store the data model 201. The data model 201 may be used when the CI instance creating unit 103 creates a set of data indicating a predetermined attribute of the CI and a relation between CIs.

The relation table 108 may store the relation model 204. The relation model may be used when the CI instance creating unit 103 creates a set of data indicating a predetermined attribute of the CI and the relation between the CIs.

As shown in FIG. 1A, the discovery unit 101 may detect information regarding management-target software connected to the computer system 100 via a network. In one embodiment, for example, the discovery unit 101 may detect information regarding SW X of device A and regarding SW Y of device B, where device B uses device A. The CI identifying unit 102 may determine, with reference to the CMDB 105, whether the detected information is information regarding a new CI. Based on this determination, the CI instance creating unit 103 may create a CI instance of SW X of device A, a CI instance of SW Y of device B, and an instance of a relation ("usedBy") between those CI instances. Each detected instance may then be stored in the CMDB 105. As shown in FIG. 1A, for example, the CI instance of SW Y of device B may be stored in a "usedBy" relation with the CI instance of SW X of device A.

Although SW X of device A and SW Y of device B have been described herein as examples of configuration items, one skilled in the art will recognize that the present invention is equally applicable to a case where SW Y of device B is replaced by a hardware configuration item.

In short, the discovery unit 101 may create CIs and relations between CIs according to the data model 201 and based on the detected information regarding the CI. The CIs and relations may then be registered in the CMDB 105. Particularly, the CMDB 105 may store an attribute of the CI and relations between the CI and other CIs. Accordingly, a system administrator may be able to extract a real dependency between the CIs using the CMDB 105.

Figure 1B:
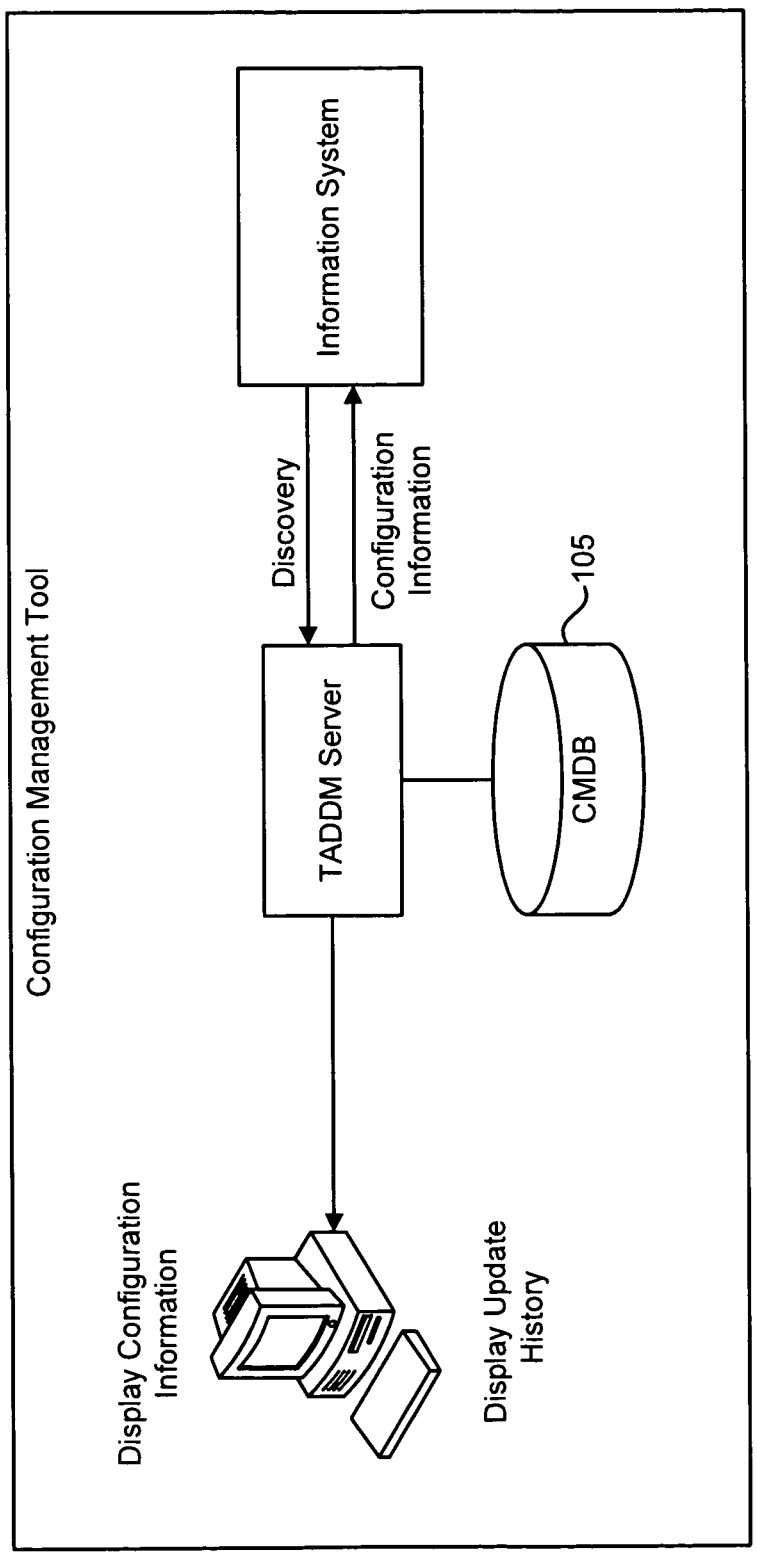
FIG. 1B is a high-level block diagram of a TADDM system in accordance with embodiments of the invention.

Referring now to FIG. 1B, a configuration management tool in accordance with an embodiment of the present invention may perform multiple functions. For example, the configuration management tool may automatically collect information regarding configuration items ("configuration information") by performing a discovery function. Further, the configuration management tool may graphically display the configuration information (a topology function), and may analyze an update history and configuration comparison (an analytic function).

In one embodiment, for example, a TADDM server may acquire configuration information regarding an information system using the ssh, the SNMP, or the WMI. The configuration information may include, for example, a type of operating system for each information system and a configuration thereof, as well as a type of application and a configuration value thereof. The TADDM server may store the acquired information in the CMDB as a CI instance. The TADDM server may then send configuration information and update history information to an administrator's computer on the basis of the stored CI instance. The administrator's computer may display the configuration information and the update history using the information.

Figure 2A:
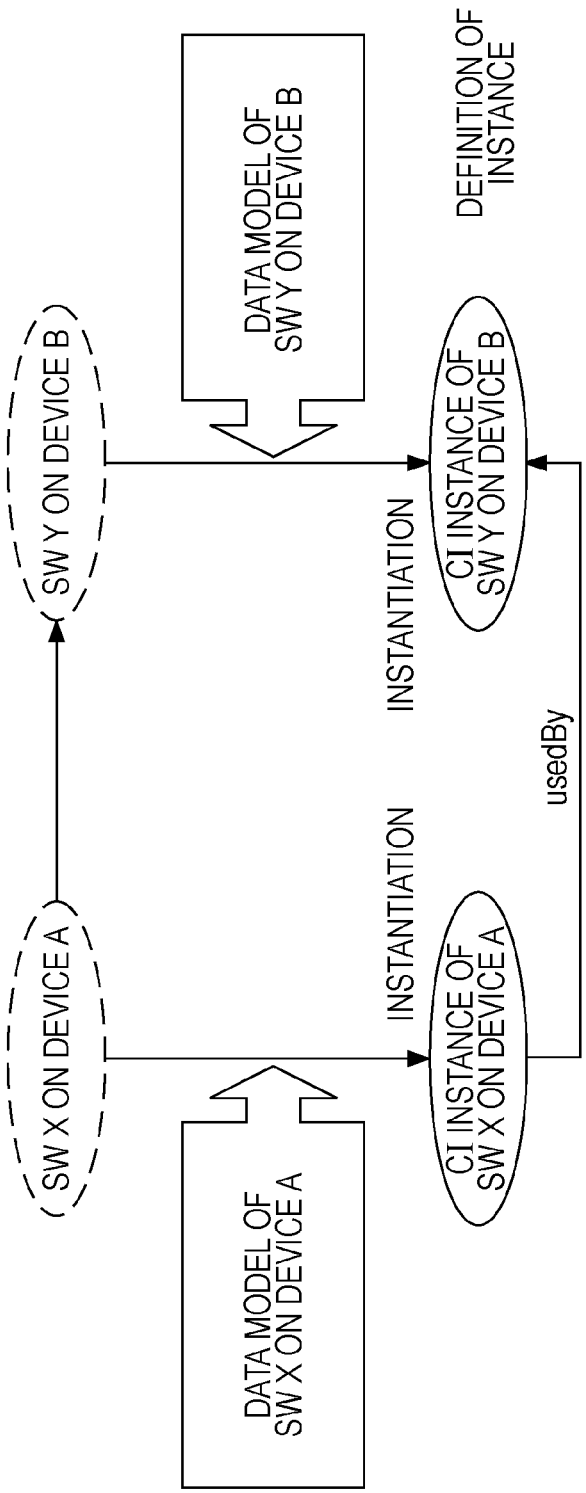
FIG. 2A is a high-level block diagram depicting creation of CI instances of SW X of a first device and SW Y of a second device according to an embodiment of the invention.

Referring now to FIG. 2A, CI instances of SW X of device A and of SW Y of device B may be created according to certain embodiments of the invention. Specifically, in one embodiment, a CI instance of SW X of device A may be created by the CI instance creating unit 103. The CI instance creating unit 103 may use a data model of SW X of device A that includes information detected by the discovery unit 101 regarding SW X of device A. Similarly, the CI instance of SW Y of device B may be created by the CI instance creating unit 103. The CI instance creating unit 103 may use a data model of SW Y of device B that includes information detected by the discovery unit 101 regarding the same.

Each data model of SW X of device A and SW Y of device B may be stored in the model table 107. An instance of a relation between the CIs, i.e., a relation ("usedBy") between SW X of device A and SW Y of device B, may be created by the CI instance creating unit 103 in FIG. 1A. Particularly, the relation instance may be created according to the relation model that includes information detected by the discovery unit regarding SW X of device A. The relation model may be stored in the relation table 108.

The CI instance of SW Y of device B may be created according to a similar method. A data model of SW Y of device B may be used to create the CI instance of SW Y of device B.

FIG. 2B shows an example of the data model 201 stored in the model table 107, the discovery instance 202 stored in the discovery table 106, the CI instance 203 (of device A) stored in the CMDB 105, and the relation model 204 stored in the relation table 108.

The data model 201 may comprise a schema for defining a CI. The data model 201 may include, for example, a "model name" indicating a model of a CI, "a model attribute" indicating an attribute belonging to a CI specified by the model name, "a relation" that can be applied between the CI specified by the model name and another CI, and a "discovery method" identifying a discovery instance for use in detecting a CI specified by the model name.

Model attributes may include, but are not limited to, attributes specified by a CDM data model, for example. An administrator of the CMDB may specify an attribute of the data model 201 freely. Similarly, a relation may include, but is not limited to, the relation specified by the CDM data model, for example. The discovery method may be specified by a discovery instance name. As shown in FIG. 2B, for example, the discovery instance name is X-Discovery.

The discovery instance 202 may include descriptions regarding a "name" of a discovery instance specified by a discovery method of the data model 201, a "collection target (scope)" of the management target (CI) to be collected by the discovery unit 101, an "attribute to be collected" and a "relation to be collected" of the management target (CI) to be collected by the discovery unit 101, and a "status" indicating whether the discovery instance is active or inactive.

The CI instance 203 may include descriptions regarding an "instance name" for specifying a CI corresponding to the instance, a "model name" indicating the data model used in creation of the instance, an "attribute value" of each attribute specified by the data model, a description (value) of a "relation" specified by the data model, a "status" indicating whether the instance is active or inactive, and a "creation date" when the CI instance is created. In certain embodiments, the CI instance may further include a CI instance identifier unique to the CI instance. Although the CI instance identifier may not be particularly specified, a host name, a serial number, or a combination of other constant attribute values may be used as the identifier to distinguish the CI instance from other CI instances. The CI instance 203 of FIG. 2B, for example, indicates that this instance is a CI instance of SW X of device A (SW X ON DEVICE A), that this instance is instantiated using the data model X, that this instance includes S, T, and U as attributes and these attributes have values, that this instance is used by SW Y of device B (usedBy: SW Y ON DEVICE B), that this instance is connected to SW Z (connectAt: SW Z) and is executed by a device H (runAt: DEVICE H), that this instance is active, and that this instance includes data of the creation date.

The relation model 204 may include a schema for defining a relation specified by the data model 201. The relation model 204 may include descriptions regarding a "relation name" such as "usedBy," a "target data model" for specifying a data model that is a target of the relation, and a "description" of the relation.

Figure 2C:
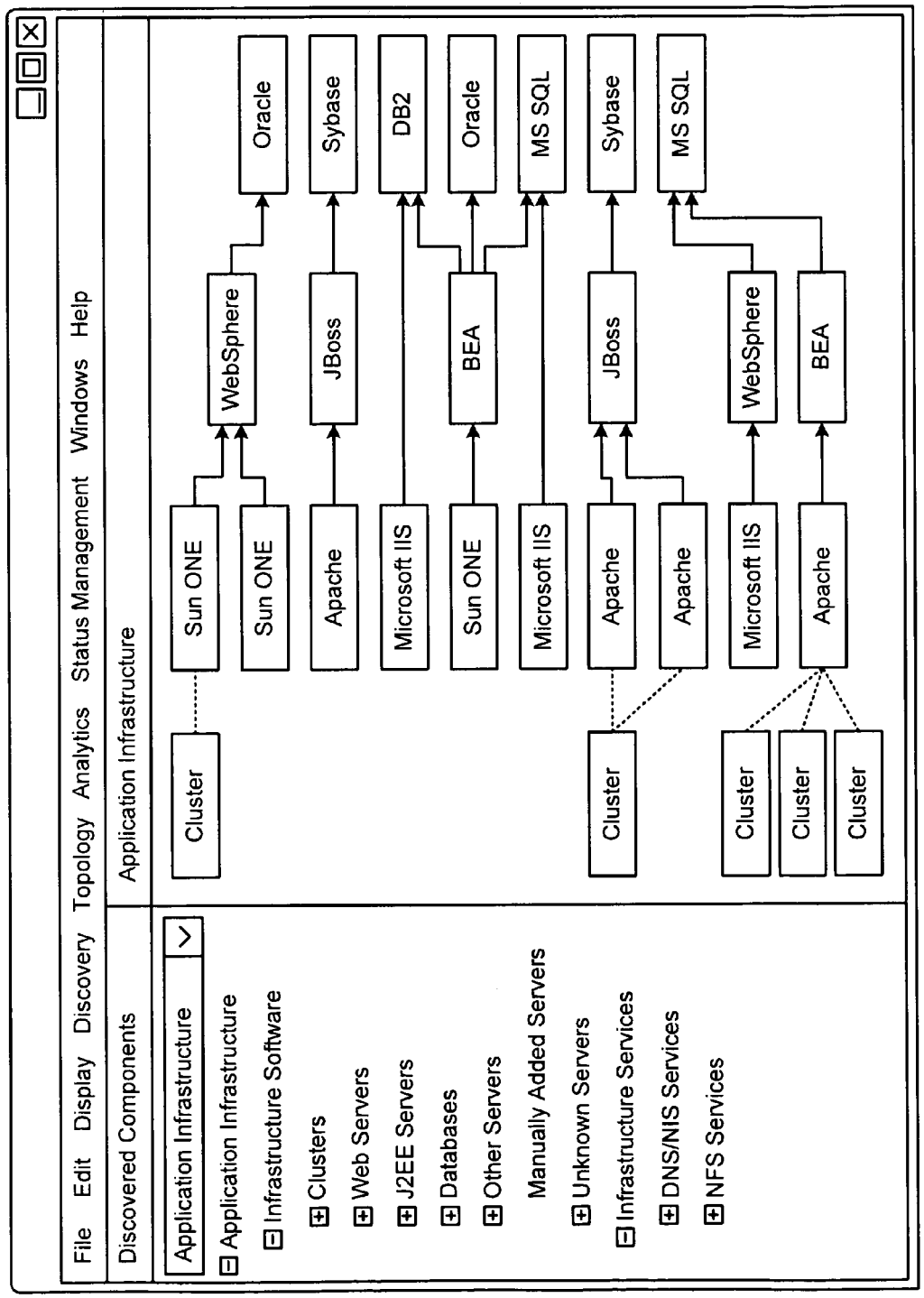
FIG. 2C illustrates an exemplary CMDB configuration information management screen in accordance with embodiments of the invention.

FIG. 2C shows an example of a configuration information management screen of the CMDB. The screen may be displayed as a GUI. The display may be performed using, for example, the TADDM. In FIG. 2C, the configuration items are shown as applications. Relations between applications are represented as solid lines. Of course, application names displayed in FIG. 2C are for illustrative purposes only and are not limited to those applications shown.

Figure 3A:
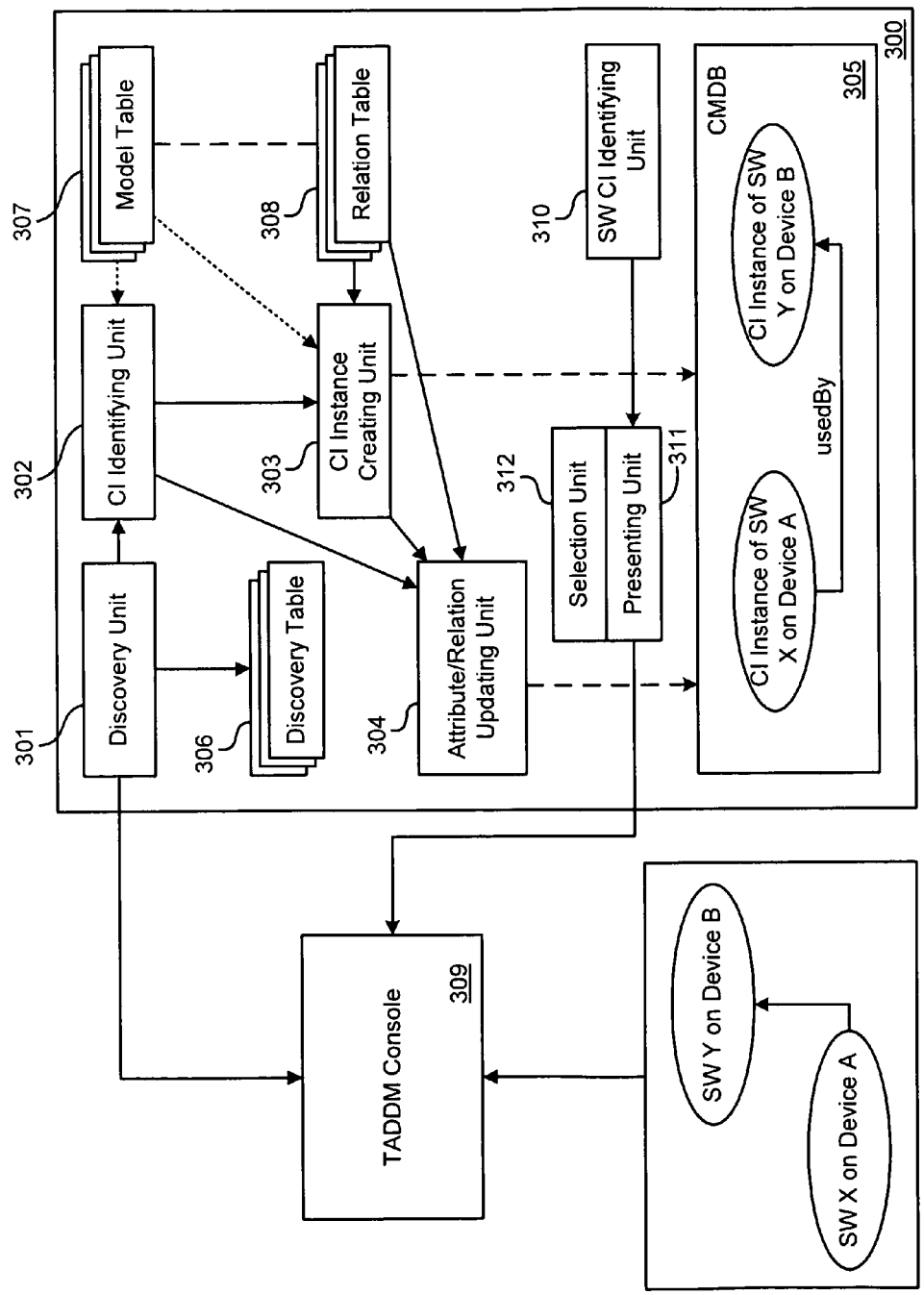
FIG. 3A illustrates an exemplary CMDB-containing computer system for identifying a software configuration item in accordance with embodiments of the invention.

FIG. 3A depicts an example of a CMDB-containing computer system 300 for identifying software configuration items according to an embodiment of the present invention. The computer system 300 may set a plurality of configuration items as management targets. Such configuration items may include at least one hardware configuration item and at least two software configuration items.

The computer system 300 may include a discovery unit 301, a CI identifying unit 302, a CI instance creating unit 303, an attribute and relation updating unit 304, and a CMDB 305. The discovery unit 301, the CI identifying unit 302, the CI instance creating unit 303, the attribute and relation updating unit 304, and the CMDB 305 may substantially correspond to the discovery unit 101, the CI identifying unit 102, the CI instance creating unit 103, the attribute and relation updating unit 104, and the CMDB 105 of FIG. 1A, respectively.

The computer system 300 may also include a discovery table 306, a model table 307, and a relation table 308. The discovery table 306, the model table 307, and the relation table 308 may substantially correspond to the discovery table 106, the model table 107, and the relation table 108 of FIG. 1A, respectively.

In addition, the computer system 300 may include an identifying unit 310 for identifying software configuration items. The identifying unit 310 may identify a second software configuration item, e.g., SW X of device A, related to a first software configuration item, e.g., SW Y of device B, on the basis of an attribute and/or a relation of a CI instance stored in the CMDB 305.

In some embodiments, the computer system 300 may be connected to a TADDM console screen 309. The screen may display CIs and connection relations therebetween. A presenting unit 311 of the computer system 300 may display on the TADDM console screen 309 the second software configuration item identified by the identifying unit 310, in addition to the first software configuration item. The computer system may also include a selection unit 312 for allowing a user to select whether to back up the identified second software configuration item. The selection unit 312 may display a checkbox that allows a user to select the second software on the screen 309.

Figure 3B:
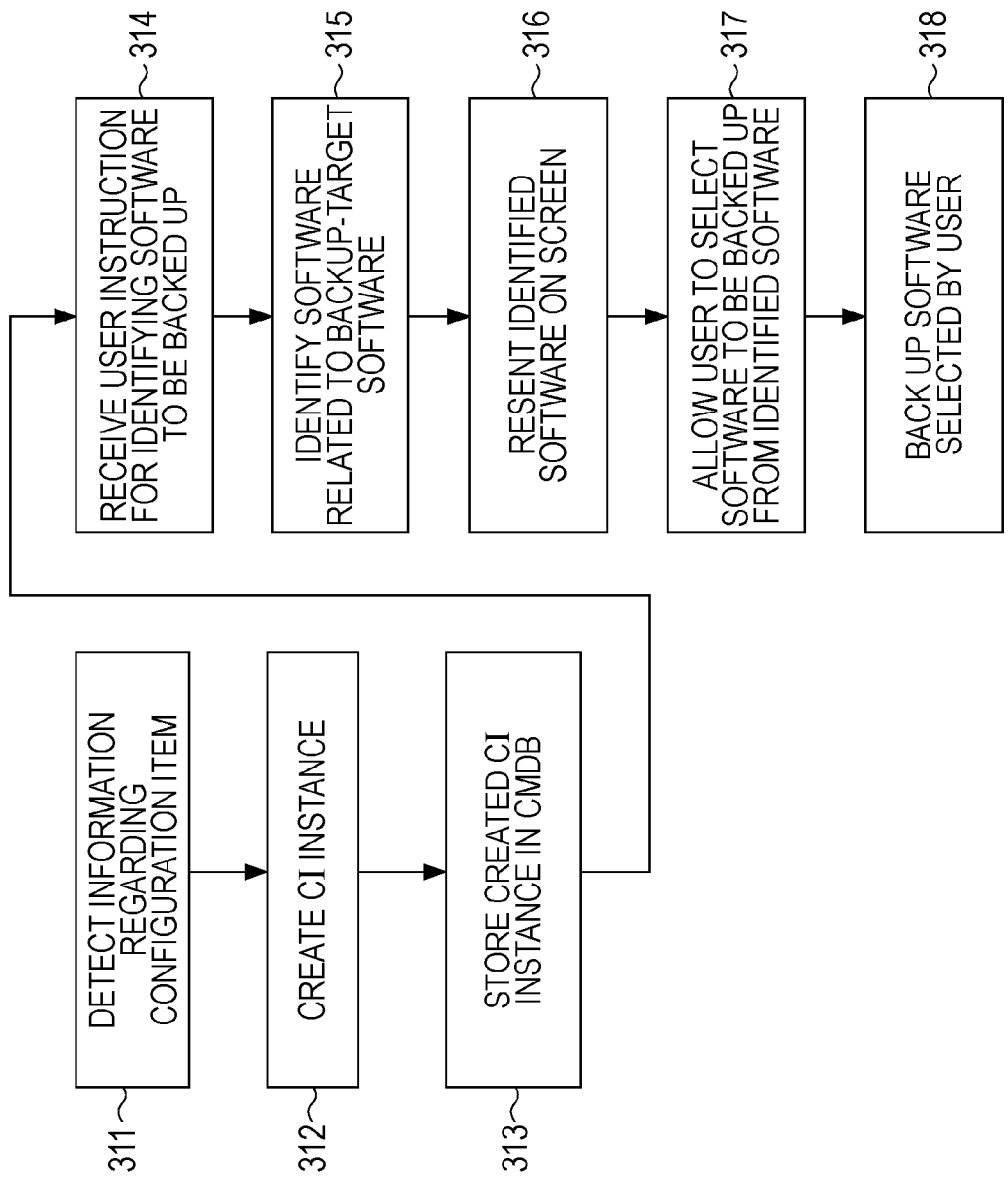
FIG. 3B is a flowchart of a method for identifying a software configuration item in accordance with embodiments of the invention.

Referring now to FIG. 3B, identifying a software configuration item in accordance with the present invention may proceed as follows. The discovery unit 301 may detect 311 information regarding a management-target configuration item of the computer system 300. For example, the discovery unit 301 may detect information regarding SW X of device A and SW Y of device B, where device B uses device A. The CI identifying unit 302 may then determine, with reference to the CMDB 305, whether the detected information is regarding a new CI. Based on this determination, the CI instance creating unit 303 may create 312 a CI instance of SW X of device A, a CI instance of SW Y of device B, and an instance of a relation ("usedBy") between those CI instances. Each of the created CI instances may then be stored 313 in the CMDB 305.

The identifying unit 310 may receive 314 a user instruction for selecting software to be backed up ("first software") from a software administrator. The software administrator may be, for example, an administrator of the computer system 300 and an administrator of a client terminal in which the backup-target software is installed. The identifying unit 310 may then identify 315 software ("second software") related to the first software, based on the attribute and/or the relation of the CI instance stored in the CMDB. The second software may then be presented 316 on the screen 309.

In one embodiment, the selection unit 312 may present 317 an interface that allows a user to select the second software to be backed up. The interface may include, for example, a checkbox for allowing a user to select the second software. The computer system 300 may then send 318 to computers in which the first software and the second software are installed a backup command for backing up the first software and the selected second software, respectively. A computer that receives the backup command may then backup the software accordingly.

In another embodiment, the computer system 300 may automatically back up all identified second software, or all second software selected according to a predetermined, user-defined backup rule.

Figure 3C:
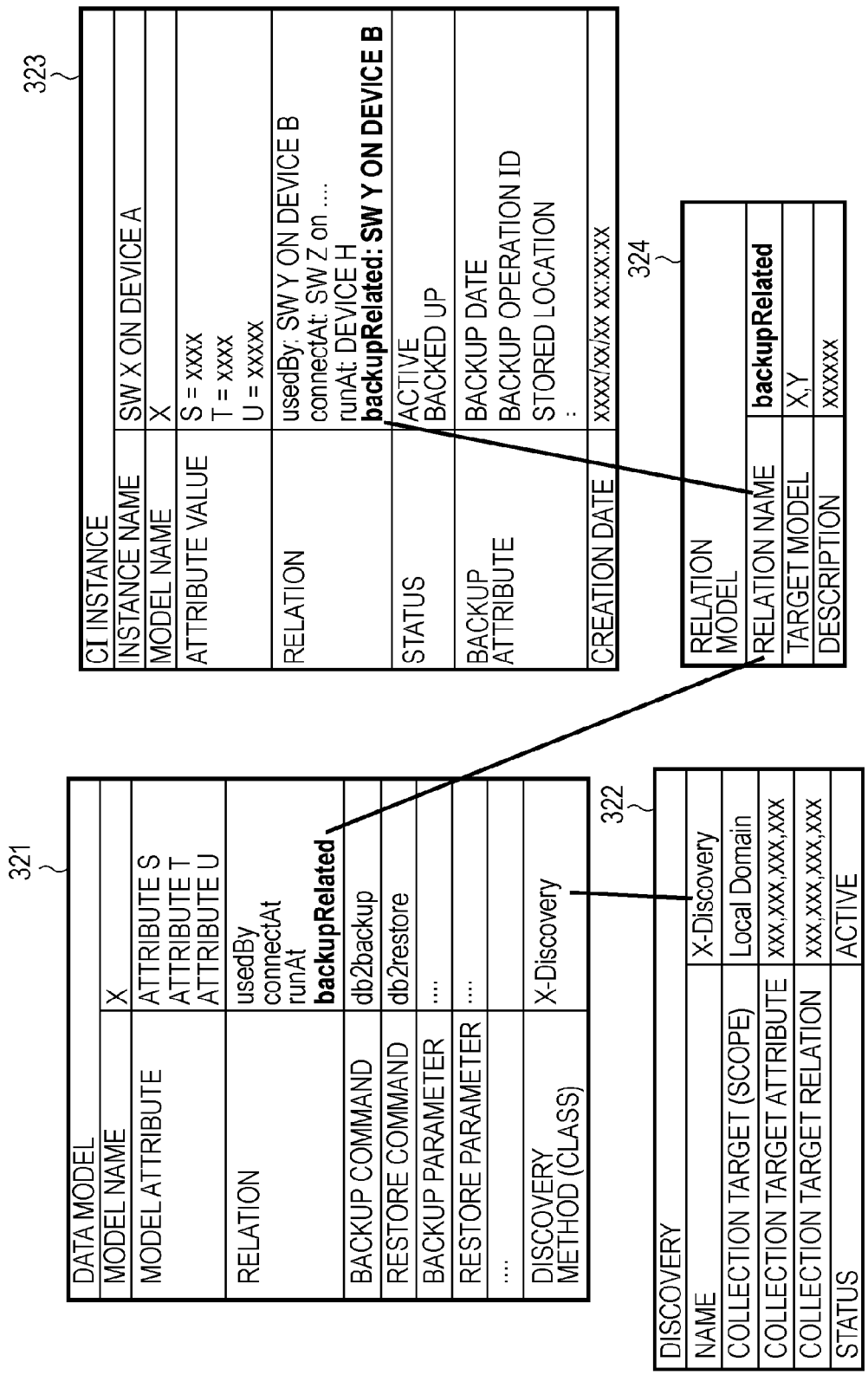
FIG. 3C illustrates an exemplary data model, discovery instance, CI instance, and relation mode related to backup of a software configuration item according to an embodiment of the invention.

Referring now to FIG. 3C, a data model 321, a discovery instance 322, a CI instance 323, and a relation model 324 related to backup of a software configuration item in accordance with embodiments of the invention are shown. Specifications of the data model 321, the discovery instance 322, the CI instance 323, and the relation model 324 of FIG. 3C may be substantially the same as those of the data model 201, the discovery instance 202, the CI instance 203, and the relation model 204, respectively, of FIG. 2B.

In some embodiments, the data model 321 may be a schema for defining a predetermined condition for creating the CI instance 323. The CI instance 323 may be created after SW X of device A is backed up. Unlike the data model 201 of FIG. 2B, the data model 321 shown in FIG. 3C includes as its attributes a backup command, a restore command, a backup parameter, and a restore parameter. The backup command may be a command used for backing up SW X in a predetermined storage device associated with hardware in which SW X is installed. The restore command may be a command used for restoring SW X in a predetermined storage device associated with the hardware in which SW X is installed. The backup parameter may be a parameter used at the time of backup of SW X. The backup parameter may include, for example, a parameter for identifying software used in the backup of SW X, a parameter for identifying the storage device in which SW X is backed up, a parameter for specifying a backup time of SW X, and a backup method of the SW X, e.g., full backup, differential backup, or incremental backup. Finally, the restore parameter may be a parameter used at the time of restoration of SW X. The restore parameter may include, for example, a parameter for identifying software used at the time of restoration of SW X, a parameter for identifying a storage device in which SW X is restored, a parameter for specifying a restoration time of SW X, and a restoration method of the SW X, e.g., full restoration, differential restoration, or incremental restoration.

In addition, unlike the data model 201 of FIG. 2B, the data model 321 of FIG. 3C includes an attribute value "backupRelated" as a relation attribute. The computer system may refer to the relation model 324 associated with the attribute value "backupRelated," which may indicate an attribute value of a target model. The discovery instance 322 may be substantially the same as the discovery instance 202 of FIG. 2B.

The CI instance 323 may be created by instantiating information regarding SW X of device A after the backup. Unlike the CI instance 203 of FIG. 2B, the CI instance 323 of FIG. 3C includes a backup attribute value "backupRelated" as a relation attribute. In addition, the CI instance 323 shown includes a backup attribute value "BACKED UP" as a status attribute. As shown, the CI instance 323 also includes a backup attribute and an attribute value thereof. The backup attribute value may include, but is not limited to, a backup date, a backup operation ID, and a storage location of backup data.

The relation model 324 may provide schema for defining a relation identified by the data model 321. In some embodiments, the relation model 324 may be used when the CI instance creating unit 103 creates a set of data indicating a predetermined attribute of SW X and a relation between SW X and another CI, such as SW Y. The relation model 324 may include descriptions such as a "relation name" related to backup, a "target model" for identifying a relation-target data model, and a "description" of the relation. As shown, for example, the "relation name" related to the backup may be "backupRelated."

Figure 4:
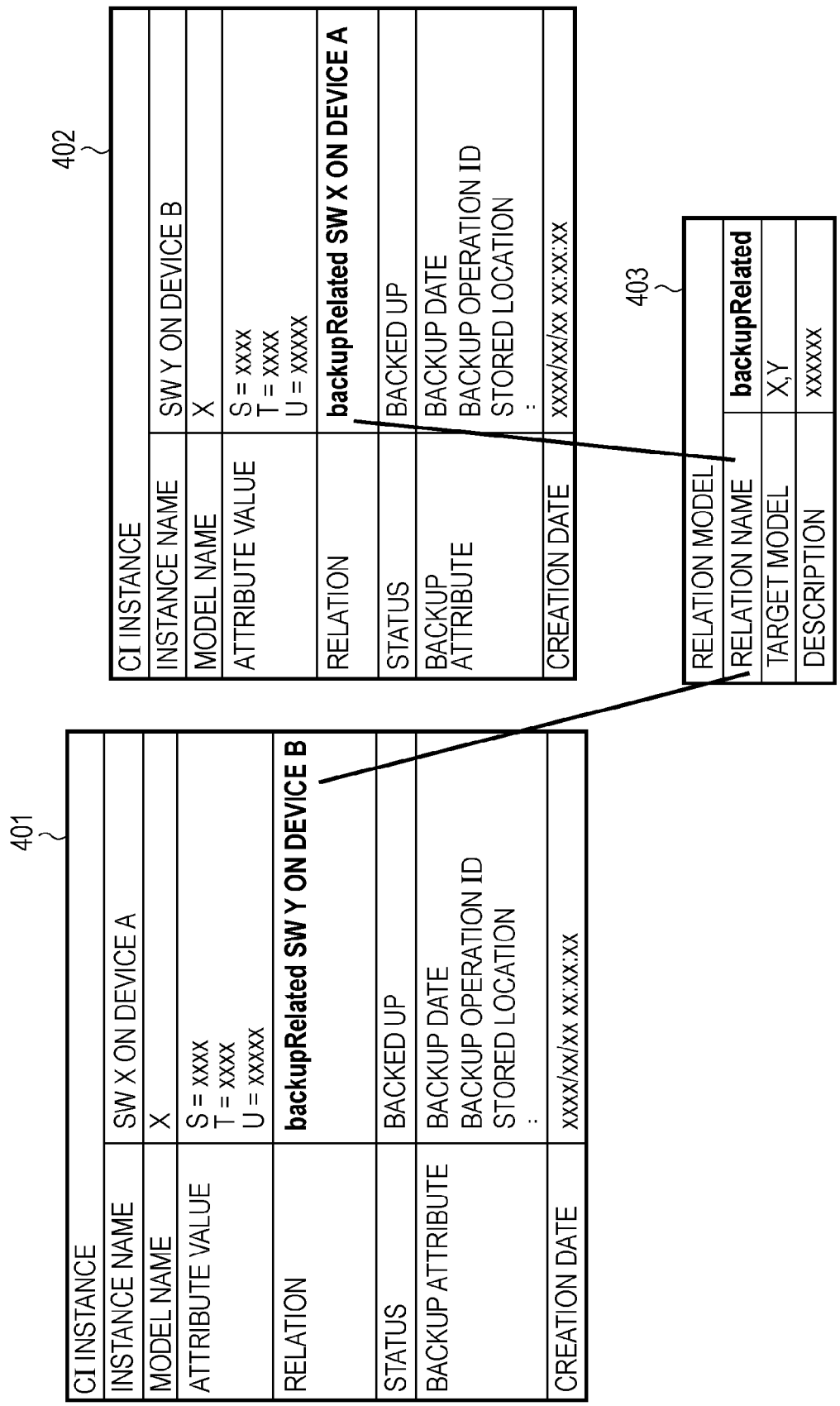
FIG. 4 illustrates a CI instance created after backup of SW X of a first device, a CI instance created after backup of SW Y of a second device, and a relation model according to an embodiment of the present invention.

FIG. 4 shows a CI instance created after backup of SW X of device A, a CI instance created after backup of SW Y of device B, and a relation model in accordance with embodiments of the present invention. As shown, a CI instance 401 of SW X of device A may include a relation attribute, a status attribute, and a backup attribute. An attribute value of the relation attribute may include, for example, "backupRelated SW Y ON Device B." An attribute value of the status attribute may include, for example, "BACKED UP." In addition, the backup attribute may include, for example, a backup date of SW X, an ID of a backup operation of SW X, and a storage location of backup data of SW X.

Similarly, a CI instance 402 of SW Y of device B may include a relation attribute, a status attribute, and a backup attribute. An attribute value of the relation attribute may include, for example, "backupRelated SW X ON DEVICE A." An attribute value of the status attribute may be "BACKED UP." In addition, the backup attribute may include a backup date of SW Y, an ID of a backup operation of SW Y, and a storage location of backup data of SW Y, for example.

The attribute value of the relation attribute of the CI instance 401 of SW X may reveal that backup data of SW X identified by the CI instance 401 is associated with the CI instance 402 of SW Y of device B. Similarly, the attribute value of the relation attribute of the CI instance 402 of SW Y of device B may reveal that backup data of SW Y identified by the CI instance 402 is associated with the CI instance 40) of SW X of device A.

Based on this association, SW X of device A may be identified in connection with backup of SW Y of device B. Through this identification, SW X of device A may be identified as a backup target related to the backup of SW Y of device B. Similarly, based on the association, SW Y of the device B may be identified in connection with, for example, backup of SW X of device A. Through this identification, SW Y of the device B may be identified as a backup target related to the backup of SW X of device A.

Figure 5A:
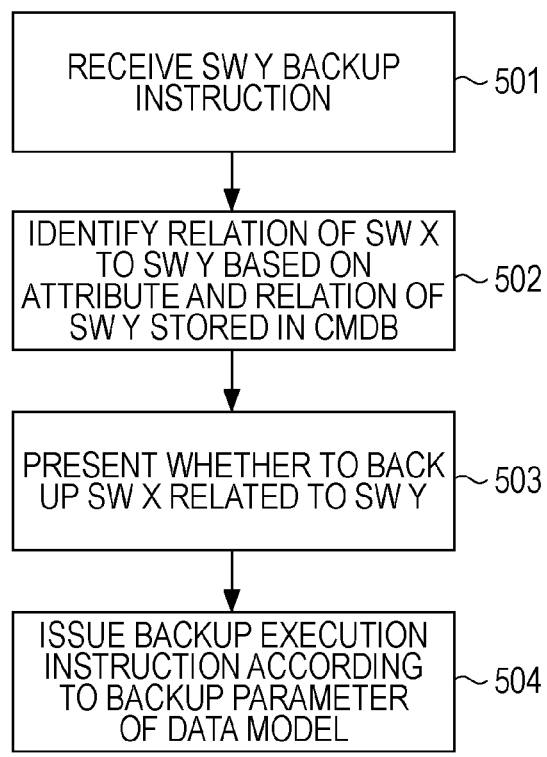
FIG. 5A is a flowchart of a method for identifying and backing up another software configuration item related to backup-target software in accordance with an embodiment of the present invention.
Figure 5B:
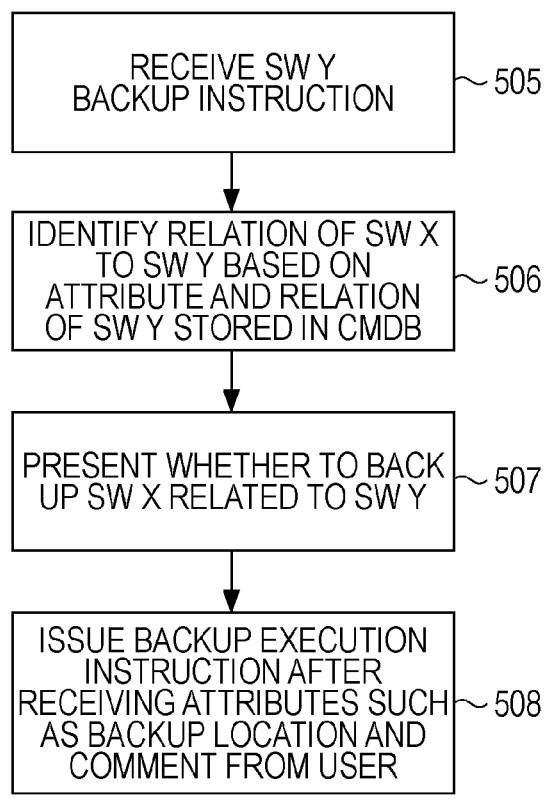
FIG. 5B is a flowchart of a method for identifying and backing up another software configuration item related to backup-target software in accordance with an embodiment of the present invention.

FIGS. 5A and 5B illustrate a method for identifying and backing up other software related to backup-target software in accordance with embodiments of the invention. As shown, a computer system may receive 501, 505 a backup command of SW Y from an administrator. In response, the computer system may detect 502, 506 that SW X is related to SW Y based on an attribute value "usedBy: SW X ON DEVICE A" of a relation attribute of a CI instance of SW Y stored in the CMDB 105. The computer system may then present 503, 507 a message for allowing the administrator to determine whether to back up the SW X related to the SW Y.

Although SW X is presented as one kind of software related to SW Y in this embodiment, various types of software may be presented to the administrator when software related to SW Y exists. In this embodiment, software related to SW Y may be determined based on the attribute value of the relation attribute stored in the CMDB. Since the attribute value of the relation attribute may be updated using a discovery function and a tracking function, the software related to SW Y may be presented to the administrator based on the actual transaction-reflected relation.

To back up SW Y, the computer system may read a backup parameter of a data model of SW Y, and issue 504 a backup execution instruction according to the backup parameter. The backup execution instruction may be issued to a computer in which the SW Y is installed. Meanwhile, the computer system may require the administrator to input part of the backup parameter. Alternatively, the computer system may require the administrator to input attributes, such as, for example, a backup location and a comment. The computer system may then receive the input attributes, such as the backup location and the comment, and send 508 the backup execution instruction to a computer in which the SW Y is installed. After receiving the backup execution instruction, the computer in which SW Y is installed may back up SW Y.

If the administrator selects to back up SW X (related to SW Y), the computer system may read a backup parameter of the data model 321 of SW X, and issue 504 a backup execution instruction according to the backup parameter. The backup execution instruction may be issued to a computer in which SW X is installed. Meanwhile, the computer system may require the administrator to input part of the backup parameter. Alternatively, the computer system may require the administrator to input attributes, such as, for example, a backup location and a comment. The computer system may then receive the input attributes, such as the backup location and the comment, and send the backup execution instruction to a computer in which the SW X is installed. After receiving the backup execution instruction, the computer in which the SW X is installed may back up the SW X.

After finishing backup of SW Y, a CI instance 402 of SW Y including a backup attribute, which is different from the CI instance of SW Y, may be created. Accordingly, two CI instances of SW Y, namely, the original CI instance of SW Y and the CI instance of SW Y including the backup attribute, may exist in the CMDB 105. However, since a status attribute of the original CI instance of SW Y may be changed into inactive, the latter CI instance of SW Y including the backup attribute may be valid.

Similarly, after finishing the backup of SW X, a CI instance 401 of SW X including a backup attribute, which is different from the CI instance 323 of SW X may be created. Accordingly, two IC instances of SW X, namely, the original CI instance of SW X and the CI instance of the SW X including the backup attribute, may exist in the CMDB 105. However, since a status attribute of the original CI instance of the SW X may be changed into inactive, the latter CI instance of SW X including the backup attribute may be valid.

An attribute value of the relation attribute may be added to the CI instance of SW X and the CI instance of SW Y, which may be backed up in the same backup operation. The attribute value of the CI instance of SW X may be "backupRelated SW Y ON DEVICE B," whereas the attribute value of the CI instance of SW Y may be "backupRelated SW X ON DEVICE A."

By backing up SW X at the time of backup of SW Y as described above, it may be possible to back up software configuration items having, for example, a transaction dependency in a unit of transaction.

FIG. 5C shows a relation model 510 having an attribute value of a relation name equal to "backupRelated," in accordance with certain embodiments of the invention.

In response to backup of SW X of device A, the computer system may create 510 a CI instance of SW X of device A using a data model of the same. Similarly, in response to backup of SW Y of device B, the computer system may create 510 a CI instance of SW Y of device B using a data model the same.

The attribute value of the relation attribute in the CI instance of SW X of device A and the CI instance of SW Y of device B created before the backup may be "usedBy" 509. In contrast, the attribute value of the relation attribute in the CI instance of SW X of device A and the CI instance of SW Y of device B created after the backup may be "backupRelated" 510. In the CI instances created after the backup, the relation between the CI instance of SW X of device A and the CI instance of SW Y of device B may be identified by the relation attribute value "backupRelated."

Figure 6A:
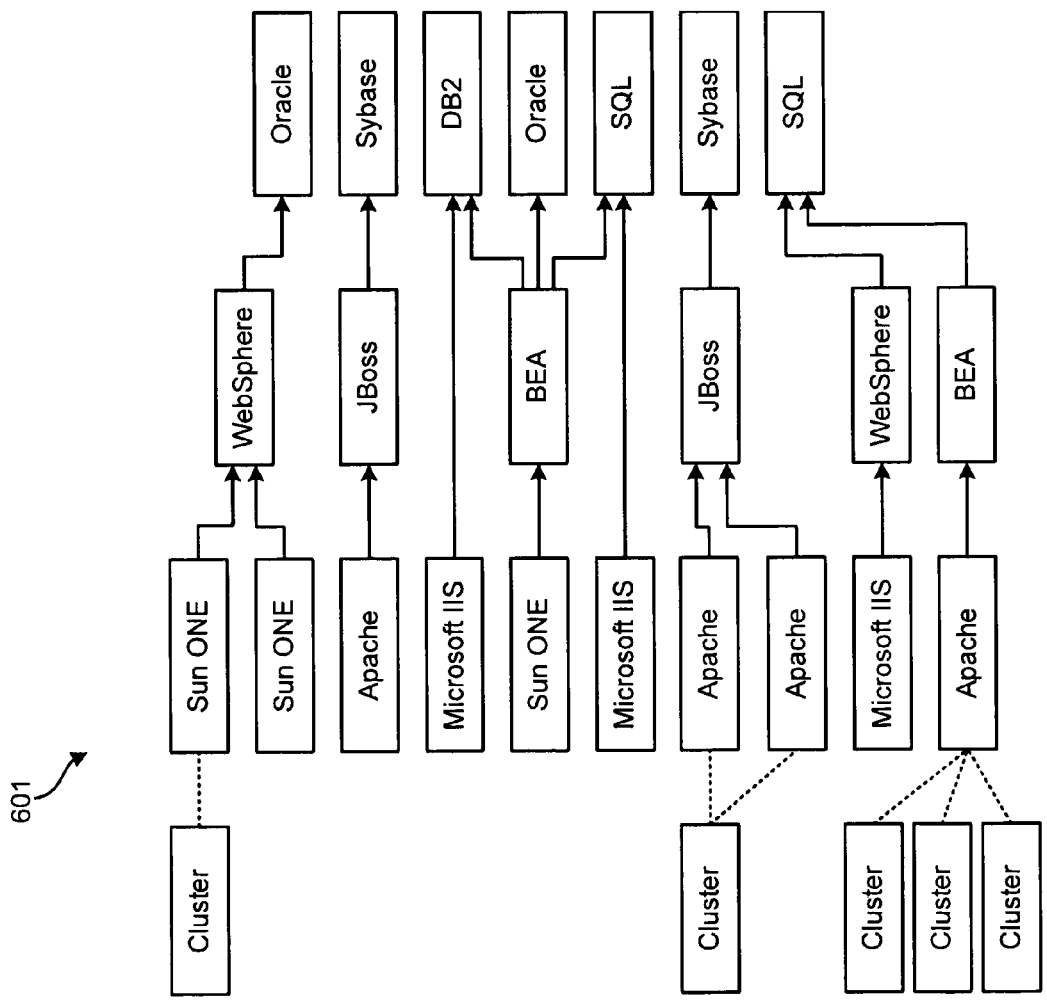
FIG. 6A illustrates an exemplary screen displaying software configuration items in a CMDB and relations therebetween in accordance with embodiments of the invention.

FIGS. 6A to 6E show backup and restoration operations using backup historical information according to embodiments of the invention. Particularly, FIG. 6A shows an example screen that displays software configuration items stored in the CMDB, and relations between the software configuration items according to an embodiment of the present invention.

In an example screen 601, relations between software configuration items may be indicated by a link or line. For example, one software configuration item may be associated with another software configuration item through a link, and that software configuration item may be associated with still another software configuration item through a link.

Figure 6B:
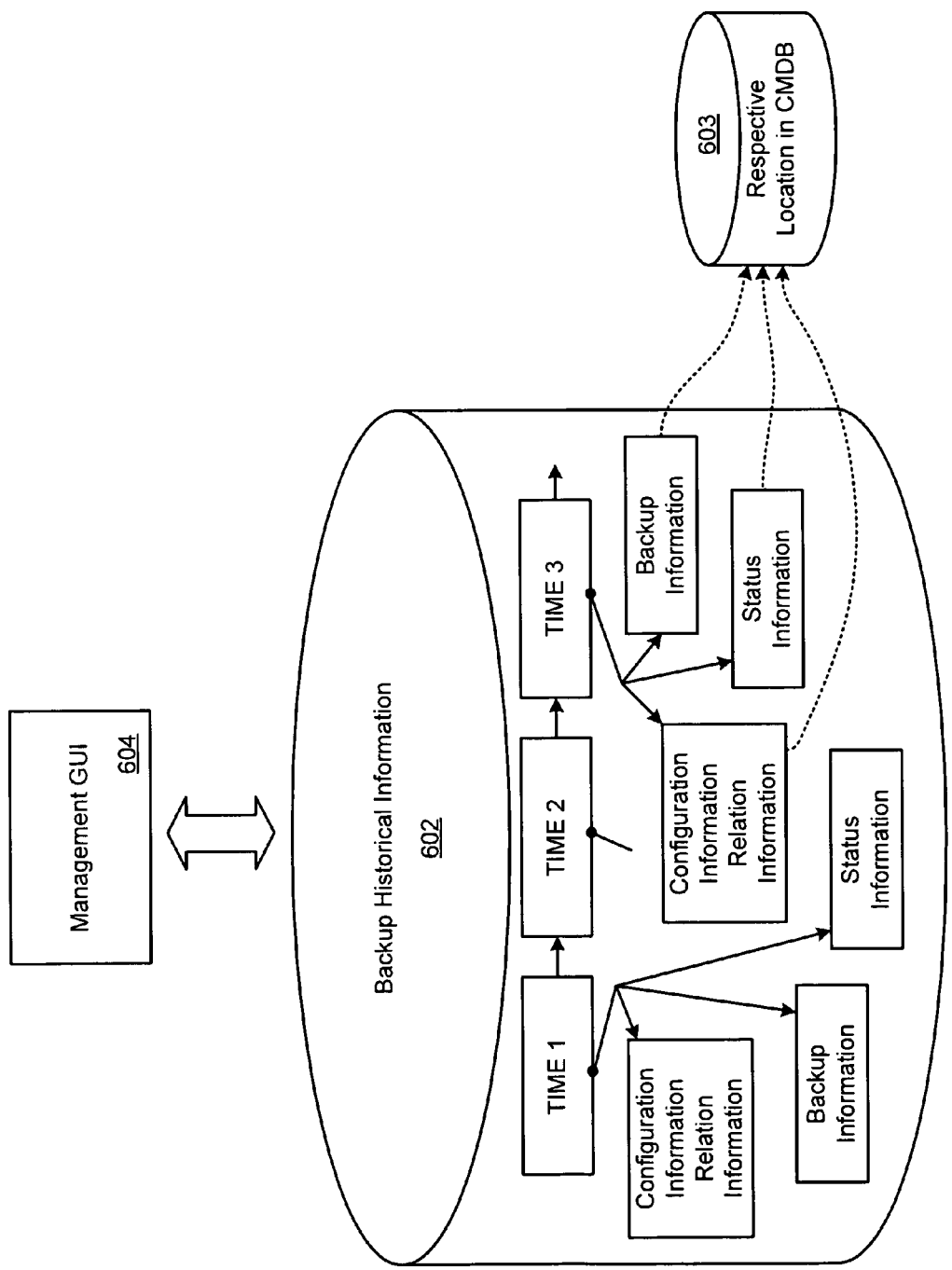
FIG. 6B illustrates backup historical information in accordance with an embodiment of the invention.

FIG. 6B shows backup historical information in accordance with an embodiment of the invention. Backup historical information 602 may be used for management of a backup history. The backup historical information may include, for each backup time, configuration information, relation information, status information, and backup information, for example. Each backup time may include a time of backup and a backup end time. Using the backup historical information 602, an administrator may select a backup time of backup data based on the restoration performed.

Each backup time may correspond to a time spaced by a given interval, or a time set by an administrator. For example, as shown in FIG. 6B, each time is indicated as time 1, time 2, and time 3.

The configuration information at a backup time may include an attribute value of at least one predetermined attribute of a software configuration time backed up at the backup time. For example, the configuration information of SW X may correspond to the attribute values of the CI instance 401 in FIG. 4. Similarly, the configuration information of SW Y may correspond to the attribute values of the CI instance 402 in FIG. 4. The configuration information may include data that identifies the CI instance, e.g., an instance name of the CI instance.

The relation information at backup time may include a relation value indicating a relation between a software configuration item backed up at the backup time and another configuration item. For example, the relation information of SW X may correspond to the relation of the CI instance 401 in FIG. 4. Similarly, the relation information of SW Y may correspond to the relation of the CI instance 402 in FIG. 4. The relation information may include data that identifies the CI instance, e.g., an instance name of the CI instance.

The status information at a backup time may include a value indicating a status of a CI instance of a software configuration item backed up at the backup time. For example, the status information of SW X may correspond to the status of the CI instance 401 in FIG. 4. Similarly, the status information of SW Y may correspond to the status of the CI instance 402 in FIG. 4. The status information may include data that identifies the CI instance, e.g., an instance name of the CI instance.

The backup information at a backup time may include a backup date, a backup operation ID, and a storage location at the backup time. For example, the backup information of SW X may correspond to the backup attribute of the CI instance 401 in FIG. 4. The backup information of SW Y may correspond to the backup attribute of the CI instance 402 in FIG. 4. The backup information may include data that identifies the CI instance, e.g., an instance name of the CI instance.

In certain embodiments, an administrator may browse the backup historical information 602, along with the software configuration items stored in the CMDB and the relations between the software configuration items, through a management GUI 604.

The backup historical information 602 may be created each time the backup operation is executed. The created backup historical information 602 may be stored in a storage device such as a hard disk.

Figure 6C:
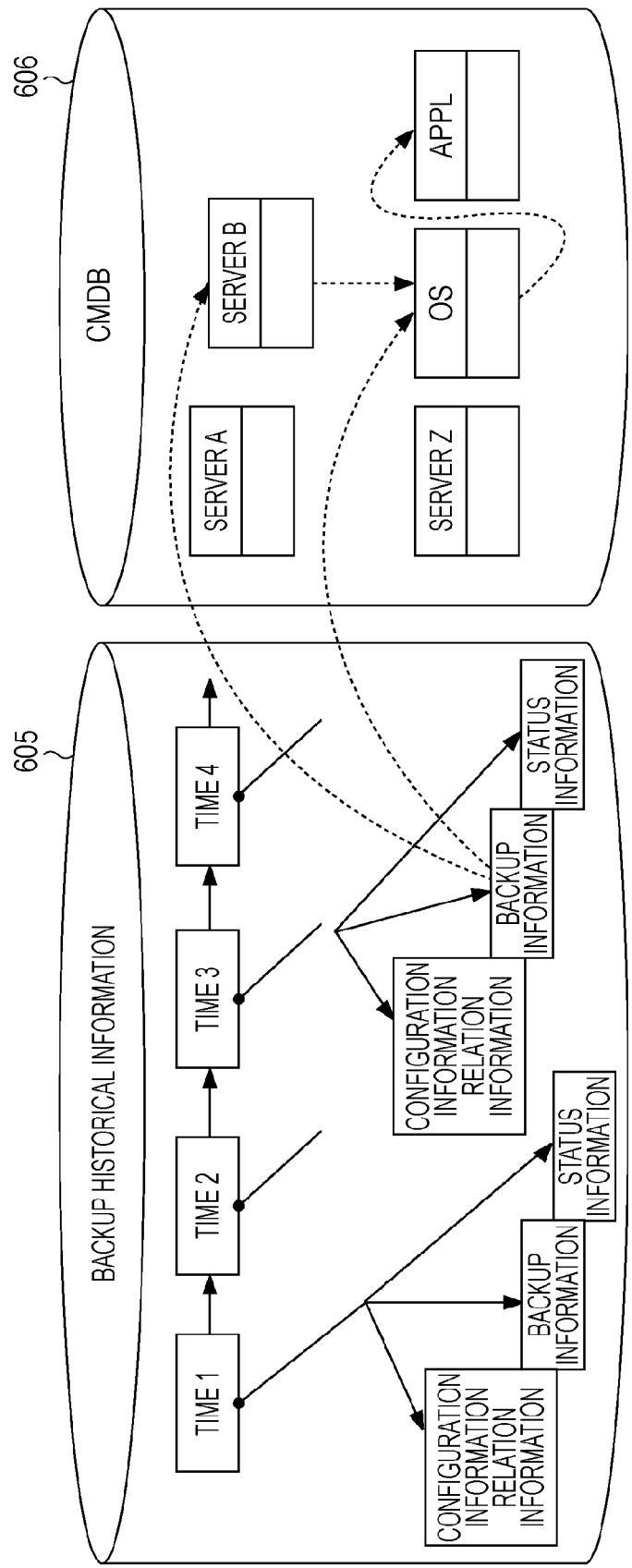
FIG. 6C depicts relations between backup historical information and software configuration item instances stored in a CMDB in accordance with embodiments of the invention.

FIG. 6C shows a relation between backup historical information and software configuration item instances stored in the CMDB in accordance with certain embodiments of the invention. Backup information at a time 3 of backup historical information 605 may include information for identifying a CI instance of a server B or a CI instance of an operating system ("OS") installed in the server B and stored in a CMDB 606. A backup attribute of the server B may include an attribute value regarding backup of the entire server B. A relation attribute of the server B may include an attribute value indicating that the OS is installed in the server B. A relation attribute of the OS may include an attribute value indicating that an application ("APPL") is installed on the OS.

Figure 6D:
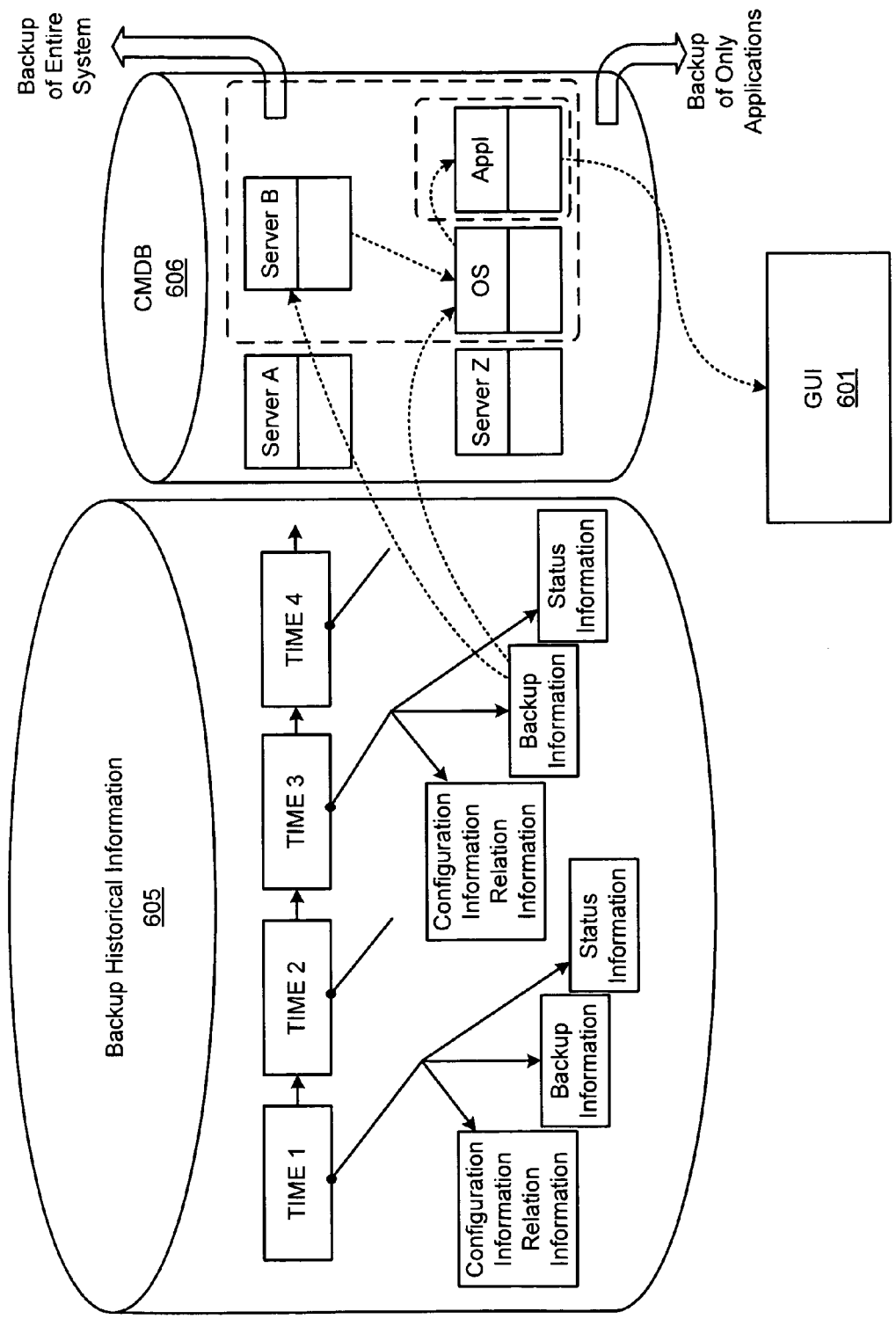
FIG. 6D illustrates a backup acquisition level in accordance with an embodiment of the present invention.

FIG. 6D shows a backup acquisition level according to an embodiment of the invention. Specifically, FIG. 6D shows that the entire system of server B may be backed up by an administrator specifying server B as a backup target at time 3. In this case, all software configuration items installed in server B may be treated as backup targets (upper level backup).

In one embodiment, the administrator may specify only the APPL as a backup target (lower level backup). In this case, only the APPL may be backed up at a given time. As shown, the APPL may include software specified by an arrow in a GUI 601.

Figure 6E:
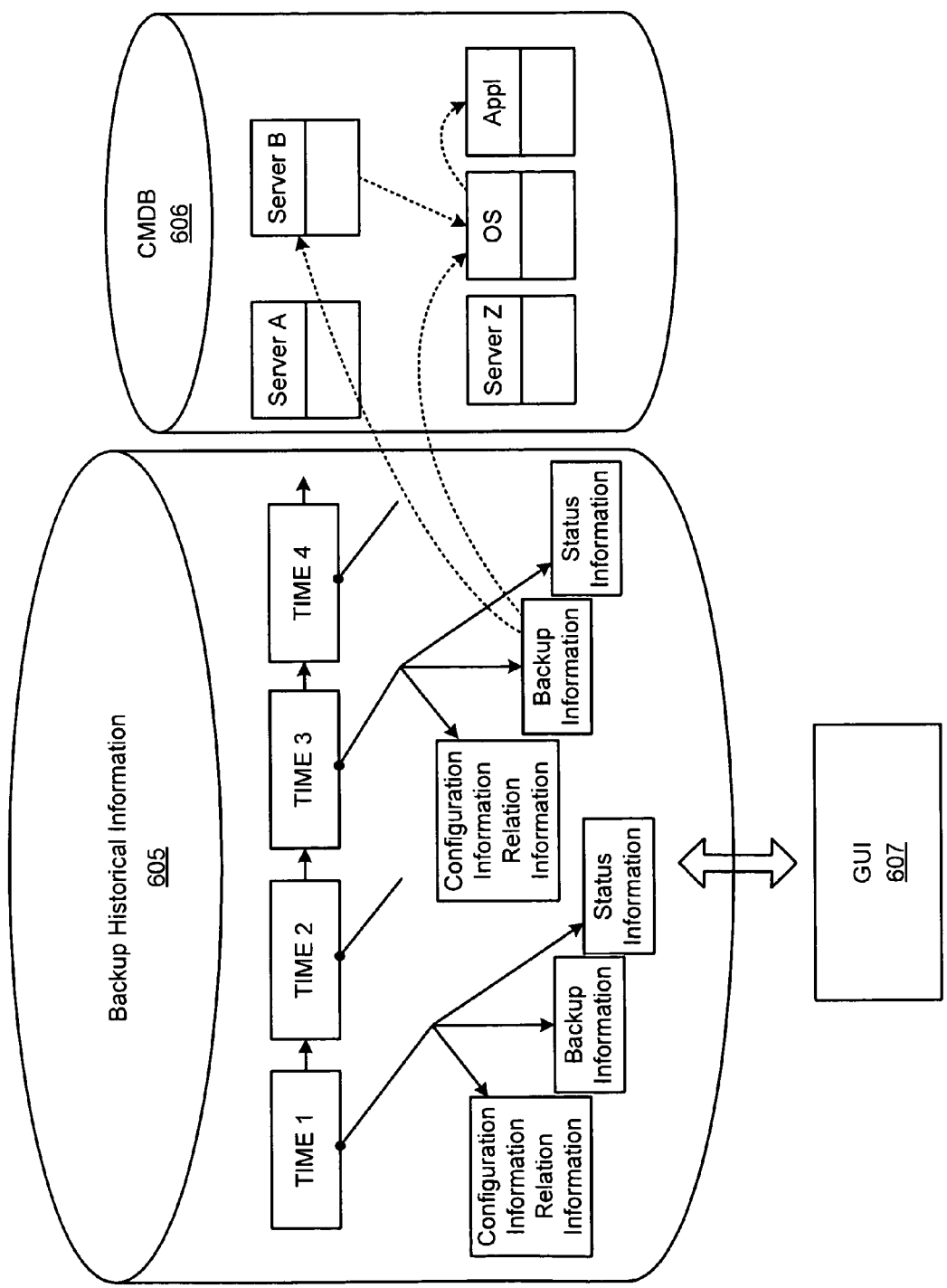
FIG. 6E illustrates exemplary backup data history management on a graphical interface in accordance with certain embodiments of the invention.

FIG. 6E shows history management of backup data on a graphical interface according to an embodiment of the present invention. Using the backup historical information 605, an administrator may retrieve restorable hardware and backup data on a graphical interface 607 while setting status information of the software configuration item, a hardware specification, and system service duration as conditions. The system service duration may include a period during which the system may be used, and an expiration date of the service. The retrieval ma be performed using a predetermined keyword. The keyword may be, for example, a data model name, a device to be introduced, a version of software or hardware, a feature, an attribute name included in a data model or CI instance, or an attribute value thereof.

In addition, the administrator may investigate on the graphical interface 607 information regarding configuration items at a particular backup time, e.g., time 1 and time 3, and a modification history regarding backup data. As a result of the investigation, the administrator may be able to retrieve backup data optimal for usage, and restore synchronized software, such as middleware, in predetermined hardware.

Backup target conditions having a policy, also known as a backup policy, will now be described. As previously discussed with reference to FIGS. 5A and 5B, the computer system may receive 501, 505 a backup command of SW Y from an administrator. In response, the computer system may detect 502, 506 that SW X is related to SW Y based on the relation attribute value "backupRelated SW X ON DEVICE A" of the CI instance 402 of SW Y stored in the CMDB 105. The related software may be detected within a scope specified by the policy on the basis of the attribute of SW Y and the relation between the configuration items. In this manner, the target software may be efficiently detected.

In some embodiments, the policy may be utilized to identify one or more backup-target software configuration items. The policy may be defined using one or more conditions of an attribute of a configuration item, such a software configuration item and a relation between configuration items. The relation between configuration items may include, for example, a relation between two software configuration items, a relation between a software configuration item and a hardware configuration item, and a relation between two hardware configuration items.

Example conditions are shown below.

1. Example of Backup Policy of Configuration Items Having Vertical Dependency of OS, Middleware, and Application Policy A: Software configuration items having a relation of "InstalledOn"

Policy B: Configuration items that satisfy the policy A and are one node (one step) away from a target software configuration item 2. Example of Backup Policy of Configuration Items on Servers that Constitute Business Application Policy C: Configuration items having a relation of "usedBy" with each other Policy D: Configuration items obtained by applying the policy A to a result of the policy C 3. Others Configuration items having a CI type attribute "middleware" out of configuration items having a given relation The condition description format and the specifiable content may be realized according to an appropriate implementation method. For example, the condition may be written using the XML language. The specifiable content may include, for example, an attribute and a relation.

An administrator may specify a specific software configuration item and a policy at the time of backup execution, thereby dynamically identifying a scope. By specifying a plurality of dynamically identified software configuration items, it may be possible to realize backup of a plurality of software configuration items in a synchronized state. An example of extracting a backup-target software configuration item using the above-described policies A to D will now be described.

Figure 7A:
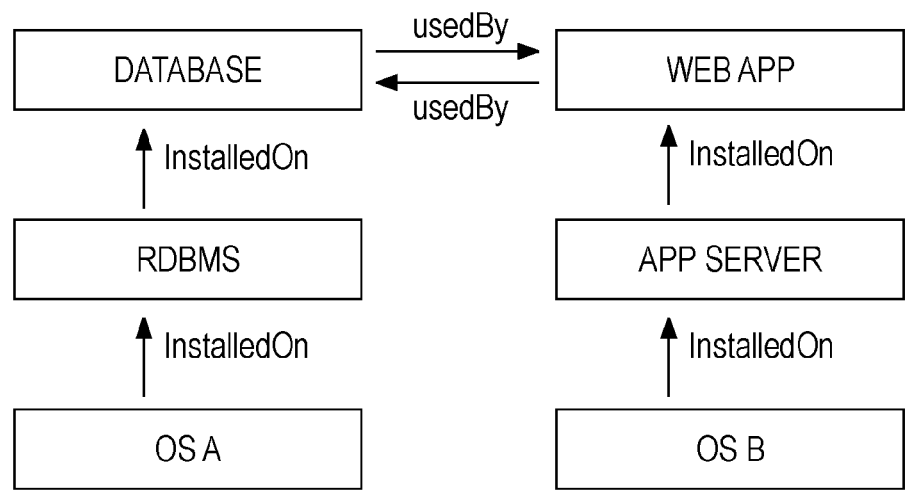
FIG. 7A depicts a plurality of software configuration items and relations therebetween for use in a description of a policy in accordance with an embodiment of the invention.

FIG. 7A shows a plurality of software configuration items and relations between the software configuration items for use in a description of a policy according to an embodiment of the invention. As shown, an OS A has a relation of "InstalledOn" with a relational database management system ("RDBMS"). The RDBMS has a relation of "InstalledOn" with a database.

Similarly, an OS B has a relation of "InstalledOn" with an application server ("App Server"). The App server has a relation of "InstalledOn" with a Web application. The database and the Web application are in a relation "usedBy" with each other.

Figure 7B:
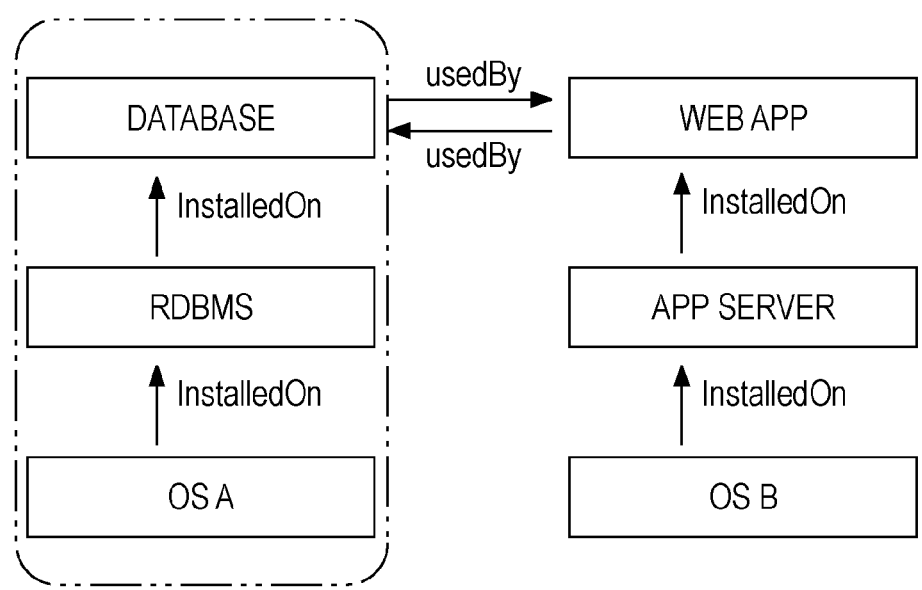
FIG. 7B illustrates one embodiment of a policy in accordance with the present invention.

FIG. 7B shows an example of using policy A in accordance with an embodiment of the present invention. Particularly, if the database is specified as a CI and the policy A is applied, CIs in a relation of "InstalledOn" may be identified as backup targets. As a result, the software configuration items of the database, the RDBMS, and the OS A may be identified.

Figure 7C:
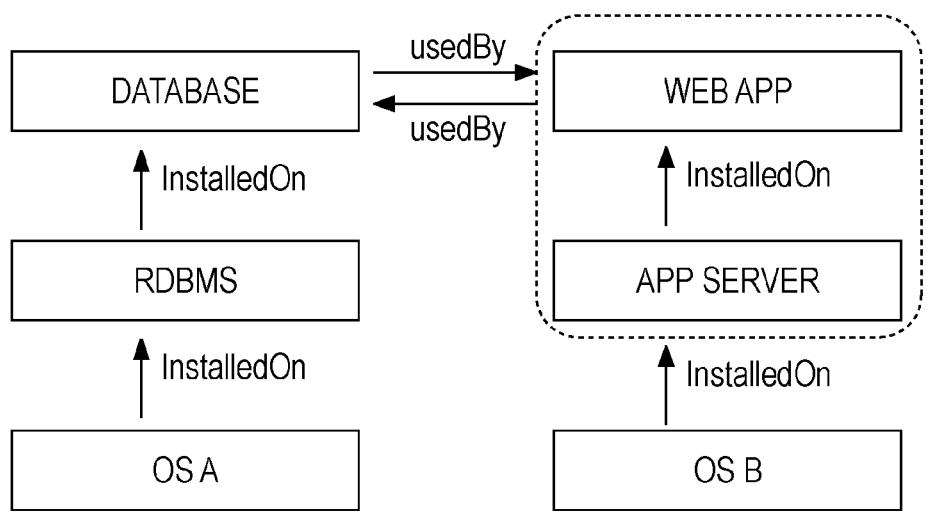
FIG. 7C illustrates an alternative embodiment of a policy in accordance with the present invention.

FIG. 7C shows an example of using policy B in accordance with an embodiment of the present invention. Particularly, if the Web application is specified as a CI and policy B is applied, CIs one node away having the relation of "InstalledOn" may be identified as backup targets. As a result, the Web application and the App server may be identified.

Figure 7D:
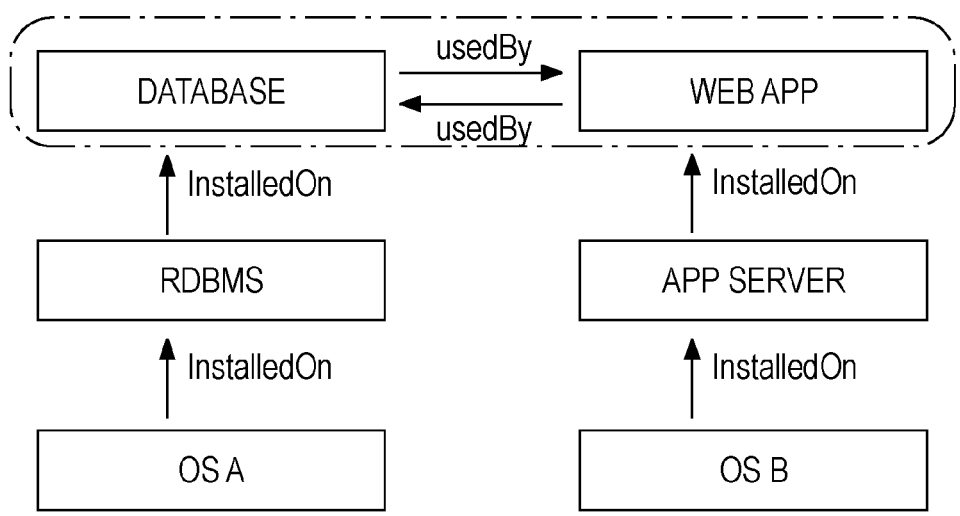
FIG. 7D illustrates another alternative embodiment of a in accordance with the invention.

FIG. 7D shows an example of using policy C in accordance with an embodiment of the present invention. Particularly, if the database is specified as a CI and policy C is applied, software configuration items having the relation of "usedBy" with each other may be identified. As a result, the database and the Web application may be identified.

Figure 7E:
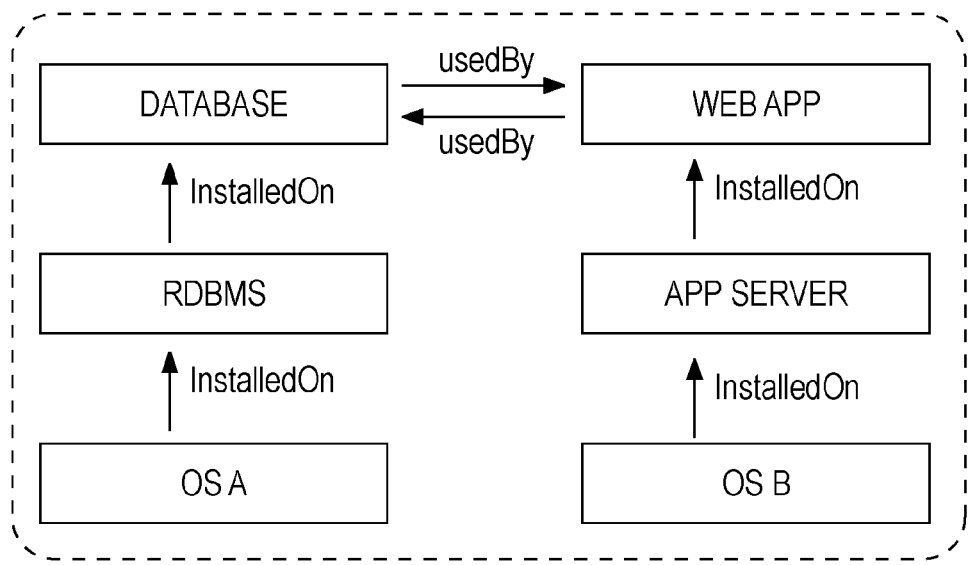
FIG. 7E illustrates yet another alternative embodiment of a policy in accordance with the present invention.

FIG. 7E shows an example of using policy D in accordance with an embodiment of the present invention. If the database is specified as a CI and policy D is applied, the database and the Web application may be identified as backup targets. Configuration items among the identified backup targets having the relation of "InstalledOn" may further be identified as backup targets. As a result, the database, the RDBMS, the OS A, the Web application, the App server, and the OS B may be identified.

Figure 8:
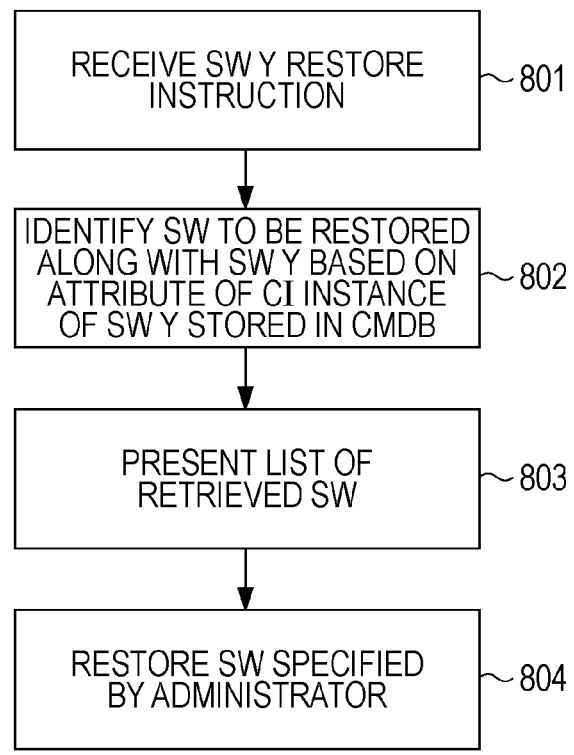
FIG. 8 is a flowchart of a method for retrieving and restoring another software configuration item related to restoration-target software in accordance with an embodiment of the present invention.

FIG. 8 depicts an operation for retrieving and restoring software related to restoration-target software in accordance with an embodiment of the present invention. A computer system may first receive 801 a restore command of SW Y from an administrator. In response, the computer system may detect 802 that SW X is related to SW Y, based on the relation attribute value "backupRelated SW X ON DEVICE A" of the CI instance 402 of the SW Y stored in the CMDB 105. The computer system may present 803 a message to the administrator to query whether to restore SW X related to SW Y. Although one type of software, namely SW X, may be presented as software related to SW Y in this embodiment, many types of software may be presented to the administrator when such software exists. By presenting other backup-data-restorable software related to SW Y at the time of restoration of SW Y backup data in this manner, work involved in constructing a desired environment may be reduced.

To restore the backup data of SW Y, the computer system may read a restore parameter of a data model of SW Y, and may issue a restoration execution instruction in accordance therewith. The restoration execution instruction may be issued to a computer in which SW Y should be installed. In some embodiments, the computer system may require the administrator to input part of the restore parameter. Alternatively, the computer system may require the administrator to input attributes such as, for example, a restoration location and a comment. The computer system may then receive the input attributes and send the restoration execution instruction to a computer in which SW Y should be installed. After receiving the restoration execution instruction, the computer in which the SW Y should be installed may restore 804 the backup data of SW Y.

Similarly, if the administrator selects to restore the backup data of SW X (related to SW Y), the computer system may read a restore parameter of the data model 321 of SW X, and may issue a restoration execution instruction in accordance therewith. The restoration execution instruction may be issued to a computer in which SW X should be installed. In some embodiments, the computer system may require the administrator to input part of the restore parameter. Alternatively, the computer system may require the administrator to input attributes such as, for example, a restoration location and a comment. The computer system may then receive the input attributes and may send the restoration execution instruction to a computer in which SW X should be installed. After receiving the restoration execution instruction, the computer in which SW X should be installed may restore the backup data of SW X.

Typically, a computer in accordance with embodiments of the invention may include a CPU and a main memory, which are connected to a bus. In some embodiments, the CPU may be based on 32-bit or 64-bit architecture. For example, the Xeon® series, the Core® series, the Pentium® series, the Celeron® series, the Phenom® series, and the Athlon® series may be used. A display, such as an LCD monitor, may be connected to the bus through a display controller. The display may be used for displaying information regarding a computer connected to a network via a communication line. The display may also be used to display, as a graphical interface, information regarding software operating in the computer for purposes of managing the computer system. A hard disk or silicon disk and a CD-ROM drive, a DVD drive, or a Blu-ray disc ("BD") drive may be connected to the bus through an IDE or SATA controller.

The hard disk may store an operating system, a program for providing a Java® processing environment such as J2EE, an operation/management program for CMDB, other programs, and data such that the programs and data may be loaded to the main memory. In some embodiments, the operation/management program may include Tivoli® Application Dependency Discovery Manager ("TADDM"), provided by IBM.

A CD-ROM, DVD, or BD drive may be used to additionally introduce programs to the hard disk from a CD-ROM, a DVD-ROM, or a BD. A keyboard and a mouse may be connected to the bus through a keyboard/mouse controller.

A communication interface may be compliant with, for example, an Ethernet® protocol, and may be connected to the bus through a communication controller. The communication interface may physically connect the computer to the communication line and provide a network interface layer for the TCP/IP communication protocol of the communication function of the operating system. Meanwhile, the communication line may be a wired or wireless LAN environment. A wireless LAN environment may be based on wireless LAN connection specifications, such as, for example, IEEE 802.11a/b/g/n.

A network switch as well as a router and a hardware management console may be used as network connection devices for connecting hardware, such as the computer. Network connection devices may return configuration information, such as an IP address and a MAC address, in response to an inquiry. Particularly, such network connection devices may use a predetermined instruction from a computer to which a network operation/management program may be introduced. The network switch and router may include an address resolution protocol ("ARP") table including a list of pairs of IP addresses and MAC addresses for computers connected thereto. Particularly, the network switch and router may return a content of the ARP table in response to an inquiry using the predetermined instruction. The hardware management console may return more detailed configuration information of the computer than the ARP table.

Although the present invention has been described based on the embodiments in the above, one skilled in the art will recognize that various modifications may be made without departing from the technical scope of the present invention. For example, a database and CIs may have a format other than a CMDB and CIs stored therein. Additionally, a given computer development environment that may call APIs having a network management function, such as C++ and C#, can be used in addition to Java®.

The invention claimed is:
1. A method comprising:
 detecting information regarding each of a plurality of configuration items, the plurality of configuration items comprising at least first and second software configuration items;
 creating a first configuration item (CI) instance for the first software configuration item and a second CI instance for the second software configuration item, wherein the first CI instance comprises a relation attribute indicating a relation between the first software configuration item and the second software configuration item;

storing the first and second CI instances;

enabling a user to establish a backup policy designating a type of relation attribute and a number of nodes away from a target software configuration item to be included in a backup;

receiving an instruction to back up the first software configuration item;

backing up the second software configuration item with the first software configuration item if the relation attribute is of the type specified in the backup policy and the second software configuration item is within the number of nodes away from the first software configuration item; and not backing up the second software configuration item if the relation attribute is not of the type specified in the backup policy or the second software configuration item is not within the number of nodes away from the first software configuration item.

2. The method of claim 1, wherein the type is one of an "assigns," "canConnect," "canUse," "connectAt," "connects," "controls," "deployedOn," "Located," "Managed," "Owned," "provides," "runAt," "uses," "installedOn," and "usedBy" type.

3. The method of claim 1, further comprising displaying the second software configuration item in response to determining that the relation attribute is of the type specified in the backup policy.

4. The method of claim 3, further comprising enabling the user to select the second software configuration item so that the second software configuration item is backed up with the first software configuration item.

5. The method of claim 4, further comprising enabling the user to not select the second software configuration item so that the second software configuration item is not backed up with the first software configuration item.

6. The method of claim 1, further comprising creating CI instances for the first and second software configuration items once the first and second software configuration items are backed up.

7. The method of claim 6, further comprising providing a model table for storing a data model for use in creating the first and second CI instances.

8. The method of claim 7, wherein the data model defines the relation attribute.

9. The method of claim 7, wherein the data model defines a backup command and a restore command.

10. The method of claim 9, further comprising restoring the first and second software configuration items on predetermined hardware in response to the restore command.

11. The method of claim 9, wherein the data model further defines a backup parameter and a restore parameter.

12. The method of claim 7, wherein the data model specifies a relation model defining the relation attribute.

13. The method of claim 12, wherein the model table stores the relation model.

14. The method of claim 1, wherein the backup policy further designates a type of configuration item.

15. The method of claim 14, further comprising determining whether the second software configuration item is of the type specified in the backup policy.

16. The method of claim 15, further comprising backing up the second software configuration item with the first software configuration item if the second software configuration item is of the type specified in the backup policy.

17. The method of claim 16, further comprising not backing up the second software configuration item if the second software configuration item is not of the type specified in the backup policy.

18. An apparatus comprising:

at least one processor;

at least one memory device coupled to the at least one processor, the at least one memory device storing computer instructions that when executed by the at least one processor cause the at least one processor to:

detect information regarding each of a plurality of configuration items, wherein the plurality of configuration items comprises at least first and second software configuration items;

create a first configuration item (CI) instance for the first software configuration item and a second CI instance for the second software configuration item, wherein the first CI instance comprises a relation attribute indicating a relation between the first software configuration item and the second software configuration item;

store the first and second CI instances in a repository;

enable a user to establish a backup policy designating a type of relation attribute and a number of nodes away from a target software configuration item to be included in a backup;

receive an instruction to back up the first software configuration item;

back up the second software configuration item with the first software configuration item if the relation attribute is of the type specified in the backup policy and the second software configuration item is within the number of nodes away from the first software configuration item; and not back up the second software configuration item if the relation attribute is not of the type specified in the backup policy or the second software configuration item is not within the number of nodes away from the first software configuration item.

19. The apparatus of claim 18, wherein the type if one of an "assigns," "canConnect," "canUse," "connectAt," "connects," "controls," "deployedOn," "Located," "Managed," "Owned," "provides," "runAt," "uses," "installedOn," and "usedBy" type.

20. A computer program product comprising:

a non-transitory computer-readable storage medium having computer-usable program code stored thereon, the computer-usable program code comprising:

computer-usable program code for detecting information regarding each of a plurality of configuration items, wherein the plurality of configuration items comprises at least first and second software configuration items;

computer-usable program code for creating a first configuration item (CI) instance for the first software configuration item and a second CI instance for the second software configuration item, wherein the first CI instance comprises a relation attribute indicating a relation between the first software configuration item and the second software configuration item;

computer-usable program code for storing the first and second CI instances in a repository;

computer-usable program code for enabling a user to establish a backup policy designating a type of relation attribute and a number of nodes away from a target software configuration item to be included in a backup;

computer-usable program code for receiving an instruction to back up the first software configuration item;

computer-usable program code for backing up the second software configuration item with the first software configuration item if the relation attribute is of the type specified in the backup policy and the second software configuration item is within the number of nodes away from the first software configuration item; and computer-usable program code for not backing up the second software configuration item if the relation attribute is not of the type specified in the backup policy or the second software configuration item is not within the number of nodes away from the first software configuration item.

* * * * *